May 12, 1964

R. L. DEGA 3,132,507

FLUID SEAL TESTING MACHINE

Filed May 2, 1960

INVENTOR.
Robert L. Dega
BY
C. P. Barnard
ATTORNEY

May 12, 1964

R. L. DEGA 3,132,507

FLUID SEAL TESTING MACHINE

Filed May 2, 1960

INVENTOR.
Robert L. Dega
BY
R. P. Barnard
ATTORNEY

May 12, 1964 R. L. DEGA 3,132,507
FLUID SEAL TESTING MACHINE
Filed May 2, 1960 6 Sheets-Sheet 5

INVENTOR.
Robert L. Dega
BY
C. P. Barnard
ATTORNEY

May 12, 1964 R. L. DEGA 3,132,507
FLUID SEAL TESTING MACHINE
Filed May 2, 1960 6 Sheets-Sheet 6

INVENTOR.
Robert L. Dega
BY
L. P. Barnard
ATTORNEY

United States Patent Office 3,132,507
Patented May 12, 1964

3,132,507
FLUID SEAL TESTING MACHINE
Robert L. Dega, Utica, Mich., assignor to General Motors Corporation, Detroit, Mich., a corporation of Delaware
Filed May 2, 1960, Ser. No. 25,963
30 Claims. (Cl. 73—45.2)

This invention relates to article testing apparatus and more particularly to a fluid seal testing machine.

The art of sealing fluids such as lubricating oil within an area defined in part by a rotating shaft or the like has become highly developed and a wide variety of fluid seal structures has evolved. However, most of the seal structures adapted for use with rotating shafts are basically formed to provide a radially inwardly extending annular flexible lip adapted to wipingly engage a shaft member extending therethrough and to provide an integral radially outwardly spaced annular body member adapted to be seated on and retained by a circumjacent housing. Fluid seals of this type are referred to as lip-type seals and often a spring element is associated with the flexible lip to insure proper sealing engagement between the flexible lip and the rotating shaft. Lip-type fluid seals of the character hereinbefore described are shown in U.S. Patents 2,867,457, 2,736,583, and 2,405,279.

Although the design of fluid seals has developed rapidly, little or no attention has previously been given to the problems of determining sealing qualities of the enormous volume of production seals presently being used before installation thereof in a particular production environment. Consequently, heretofore, fluid seals have been installed in production usage without adequate testing by either the seal manufacturer or the seal user. The only previous criterion of acceptability of a particular seal was its ability to prevent leakage in actual use. As a consequence, seal leakage has been an industrial problem ever since lip-type seals were first used on production equipment. Individual failures of lip-type seals in production usage requiring replacement thereof have cost the automotive industry alone millions of dollars. It is, therefore, apparent that a rigid quality control check on all production seals prior to installation is desirable.

Investigation of seal leakage has revealed that seal quality is a function of many variables including seal diameter, concentricity, lip pressure, etc. Attempts to measure each seal parameter individually have proven to be, if possible, much too tedious and expensive for high volume production inspection. Consequently, as proposed in my co-pending applications, Serial No. 772,858 and Serial No. 773,284, now Patent No. 2,030,800, a measure of seal quality reflecting several of the leakage variables is desirable and may be provided by a measurement of rate of air flow past a seal positioned in a simulated production environment. Maximum and minimum limits of acceptability for a particular seal usage may be established as described in the aforementioned co-pending applications. Once the maximum and minimum limits for a particular seal usage are established, it would be desirable to provide means to be used for inspection of all seals before assembly in the production environment.

Accordingly, the objects of this invention are to provide high volume fluid seal testing apparatus; to provide testing apparatus to determine sealing qualities of production fluid seals; to provide fluid seal testing apparatus having means to measure all the variables contributing to leakage of fluid seals in a production environment; to provide fluid seal testing apparatus capable of segregating unacceptable seals from acceptable seals; to provide fluid seal testing apparatus having means to segregate unacceptable fluid seals according to the particular undesirable quality found therein; to provide apparatus for automatically checking fluid seals at a plurality of stations; to provide apparatus to eject unacceptable seals at each station; to provide means to control fluid seal measuring apparatus according to the measurement to be made and the position of the seal to be tested; to provide integrated hydraulic and electrical circuitry for controlling the test apparatus; and to provide automatic fluid seal testing equipment having integrated apparatus to measure the rate of air flow past a flexible lip of a fluid seal mounted circumjacent a test shaft.

Other objects and advantages of the present invention will become apparent from the following detailed description and by reference to the accompanying drawing wherein.

In order to conduct tests on lip-type seals of a particular size with the subject apparatus, a determination is first made as to the limits of acceptability of the size of seal to be tested so that the various testing equipment of the machine can be adjusted accordingly. By test procedures involving the application of lip-type seals of the particular size manufactured for production usage to shafts having varying sizes above and below the nominal size of the shaft used in the production environment, and the measurement of air flow rate for each application under standard conditions, acceptability standards can be determined. The test results are used to specify a minimum-sized test shaft, a maximum-sized test shaft and the air flow rates required when a test seal of the particular size being considered is applied to each of the shafts to insure against leakage in the production environment. These measurements are an indication of seal acceptability relative to the diameter size and accentricity parameters of the flexible lip of the fluid seal. The lip pressure parameter is also considered and an acceptability standard is determined by the application of the particular size production seals to a test shaft of nominal production shaft diameter and measurement of air flow rate. The test results are used to specify a minimum air flow rate below a specified air pressure and a maximum air flow rate above a specified maximum air pressure. In other words, a production seal being tested relative to a nominal size shaft will have too low a lip pressure if air flow is above the minimum air flow rate below a specified air pressure and will have too high a lip pressure if air flow is below the maximum air flow rate above a specified air pressure.

Figure 1:
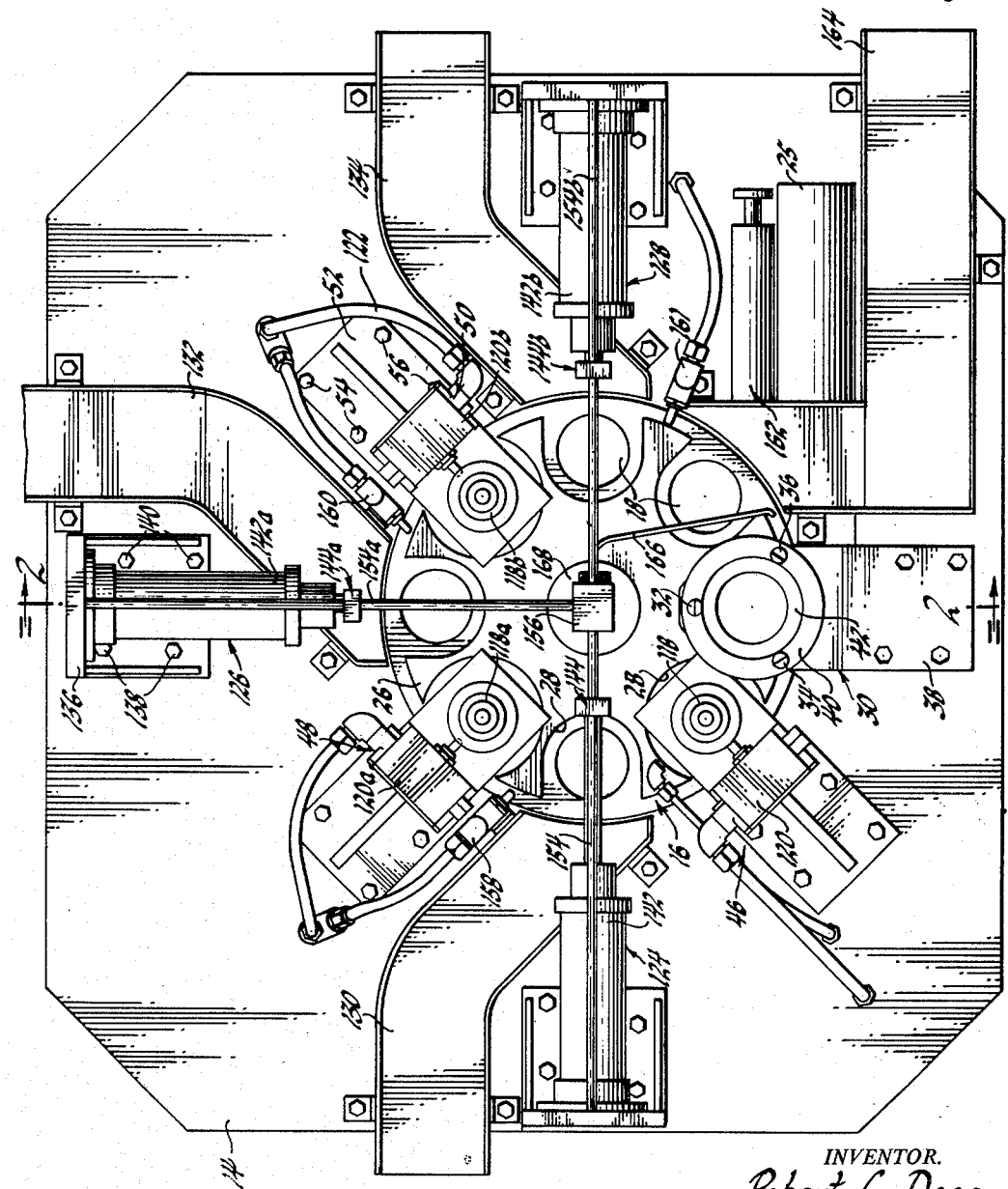
FIGURE 1 is a top view of the illustrative embodiment of the invention.

Referring now to the drawings as an illustrative example of the present invention and more particularly to FIGURE 1, a work table or support platform 14 is provided with a centrally located rotatable indexable table 16 having a plurality of through holes 18 regularly circumferentially spaced thereon. The indexable table 16 is rotatably mounted on a support pillar 20 which is secured to the table 14 by a suitable fastening means such as bolt members 22, 24. Conventional fluid actuated feed mechanism 25 is operably connected to the indexable table 16 in a conventional manner. An upper plate 26 is fastened to the top of the indexable table 16 in any suitable manner and is provided with a plurality of U-shaped recesses 28 positioned circumjacent the through holes 18 and opening radially outwardly. The U-shaped recesses 28 are wider than the through holes 18 so that a plurality of seats are provided circumjacent the through holes by the top surface of the indexable table 16. A loading station 30 is provided to automatically place a test seal on each of the aforementioned seats as each through hole 18 and U-shaped recess 28 becomes aligned thereunder, and comprises three rod members 32, 34, 36 which extend vertically upwardly from a support bracket 38 suitably secured to the work table 14. A spacing plate 40 is secured to the upper end of the rod members and provided with a central loading port 42 which is co-axially aligned with a central loading port 44 in the bracket 38. The rod members are parallel to one another and the inner edges of each inscribes a circle which is approximately equal to the outside diameter of the type of seal to be tested and radially aligned with the U-shaped recesses and through holes so that a seal will drop into position over each of the through holes as the indexable table is rotated. A plurality of testing stations 46, 48, 50 are provided around the periphery of the indexable table 16. The station 46 measures the rate of air flow past a minimum-sized shaft and the testing station 48 measures air flow past a maximum-sized shaft to determine seal quality relative to the parameters of flexible lip diameter and eccentricity as hereinbefore described. The testing station 50 measures lip pressure of the seals. Although the testing stations perform different functions they have similar structure, and therefore, only station 50 will be described in detail.

Figure 2:
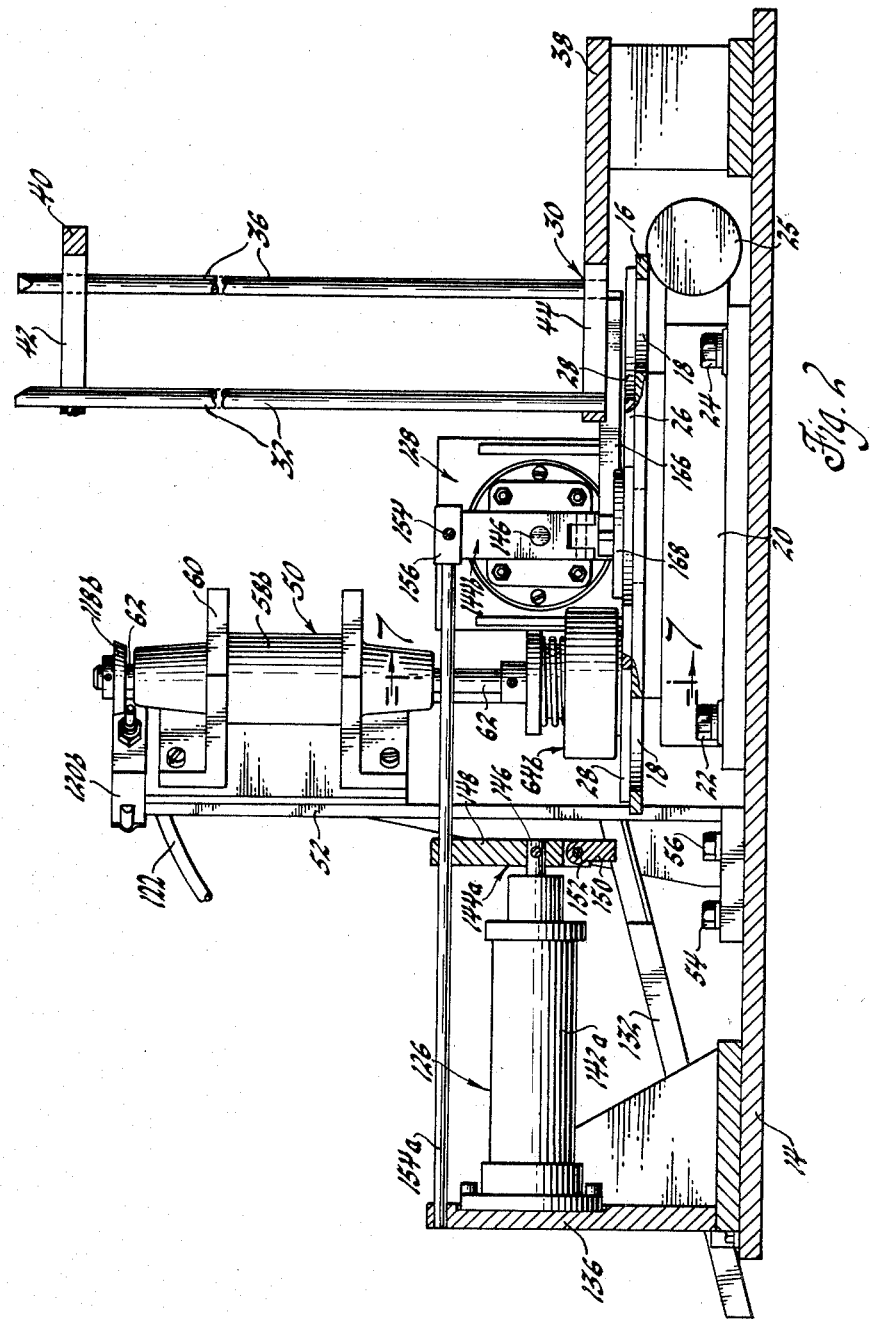
FIGURE 2 is a sectional view with parts broken away and taken along the line 2—2 in FIGURE 1.
Figure 7:
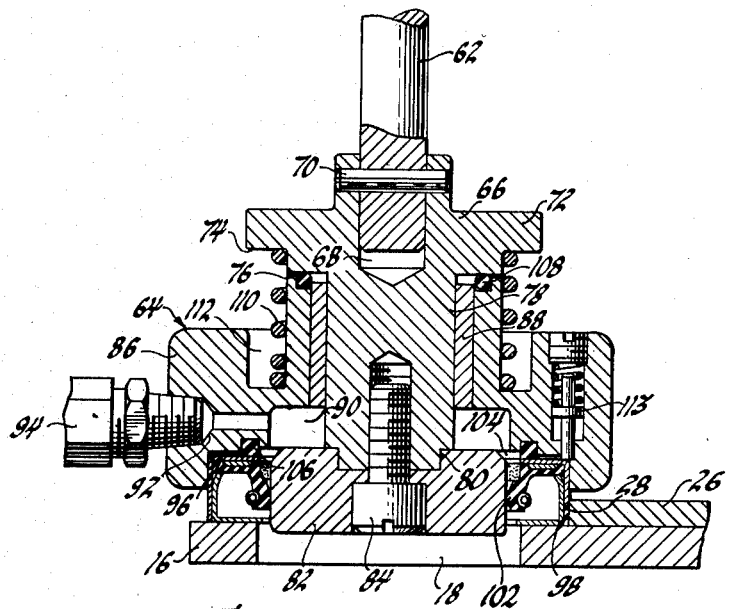
FIGURE 7 is a cross-sectional view of a gauging head of the present invention taken along the line 7—7 in FIGURE 2.

Referring now to FIGURE 2, the testing station 50 comprises a support bracket 52 which is fixed to the work table 14 by bolt members 54, 56. Air cylinders 58, 58a, 58b of conventional design are provided at each station. The air cylinder 58b at station 50 is fixed to the upper end of the bracket 52 by a support bracket 60 so that a piston rod 62 and a gauging head 64b attached to the lower end thereof may be vertically reciprocated between an upper retracted position and a lower extended position adjacent the indexable table. Similar gauging heads 64 and 64a are provided at the other testing stations. Each of the gauging heads associated with the test stations is identical except for the diameter of the test shaft associated therewith, and therefore, only the gauging head 64b is described in detail. As shown in FIGURE 7, each gauging head comprises a central support portion 66 having an upwardly opening piston rod hole 68 within which the piston rod 62 is secured by a pin member 70. The central portion 66 is further provided with a radially outwardly extending flange portion 72 which is inwardly downwardly stepped to provide seats 74, 76 and a downwardly extending cylindrical portion 78 having a seat 80 formed on the lower extremity thereof. A stub test shaft 82 is adapted to be removably secured on the seat 80 by a bolt 84. An air head 86 is concentrically mounted on a bearing sleeve 88 which is slidably supported on the cylindrical portion 78. A central air cavity 90 is provided within the gauge head 64 and has a transverse passage 92 communicating with a flexible air hose 94 which is secured to a fixture on the top of the work table 14. An annular seal cavity 96 opens downwardly from the central air cavity 90 and is adapted to receive a test seal 98 having a radially inwardly extending flexible lip portion 102 which is engageable with the outer periphery of the stub test shaft 82. In the position shown in FIGURE 7 the air head 86 and the stub shaft 82 are spaced from one another to define an annular air passage 104 which permits air under pressure to flow downwardly along the test shaft and exert pressure against the downwardly extending flexible lip 102. To insure that all air flow occurs only between the stub test shaft 82 and the flexible lip 102, a gasket 106 is seated in a recess formed on the upper surface of the seal cavity 96 and is engageable with the upper surface of the test seal 98 when the gauge head is in the lowermost position to prevent air flow radially outwardly between the air head and the test seal. In addition, an O-ring 108 or other suitable sealing means is provided between the central portion 66 of the gauge head and the air head 86 to prevent air leakage upwardly from the air cavity 90. A compression spring 110 is seated in a spring cavity 112 provided on the top of the air head 86 and abuts the seat 74 to maintain the air head 86 in a normally extended position relative to the central portion 72. The compression spring 110 allows the air head to be sealingly engaged against the top surface of the test seal 98 by downward pressure of the central portion 72 against the bias of the compression spring 110. A plurality of spring-biased ejection pins 113 are provided around the periphery of air head 86.

Referring again to FIGURE 2, a cam disc 118b is mounted on the upper end of the piston rod 62 which extends upwardly from the air cylinder 58b and is adapted to actuate a Microswitch 120b supported on the bracket 52 and connected to a conduit 122 to control mechanism to be hereinafter described. Similar Microswitches 120, 120a and cam discs 118, 118a are provided at the other testing stations.

As shown in FIGURE 1, ejection stations 124, 126, 128 are provided after each of the testing stations 46, 48, 50 and are associated with downwardly sloping ejection chutes 130, 132, 134. Each of the ejection stations perform the same function and are structurally identical so that a detailed description of the ejector mechanism at ejector station 126 will suffice. Referring now to FIGURE 2, the ejector mechanism comprises a support bracket 136 which is fixed to the work table 14 by suitable fastening devices such as the bolt members 138, 140 to horizontally support an air cylinder 142a of conventional design. Similar air cylinders 142, 142b are provided at the other ejector stations and each air cylinder controls rake members 144, 144a, 144b of similar construction. The rake member 144a is fixed to the inwardly extending end of a piston rod 146 and comprises a bifurcated plate 148 (see station 128 in FIGURE 2) to which a finger plate 150 is pivotally secured by a pin member 152 so that the finger plate 150 is movable between a downwardly extending position and a radially outwardly extending position. The ejection mechanisms are provided with guide rods 154, 154a, 154b which are fixed at one end to the air cylinder support brackets and extend radially inwardly of the indexable table 16 to a centrally located supported block 156.

As shown in FIGURE 1, Microswitches 158, 160, 161 are secured adjacent the indexable table 16 between the ejection station 124 and the test station 48, between the ejection station 126 and the test station 52, and between the ejection station 128 and the unloading station 162. The actuating finger of each of the Microswitches extends inwardly over the table and into the seal seat area at the test stations to be engaged by the outside surface of a test seal as it is located at the adjacent station for a purpose to be hereinafter described. The unloading station 162 follows the ejection station 128 and comprises an unloading chute 164 and a spring ejector arm 166 which is fixed to a central plate 168 secured to the central support shaft of the indexable table 16.

Figure 3:
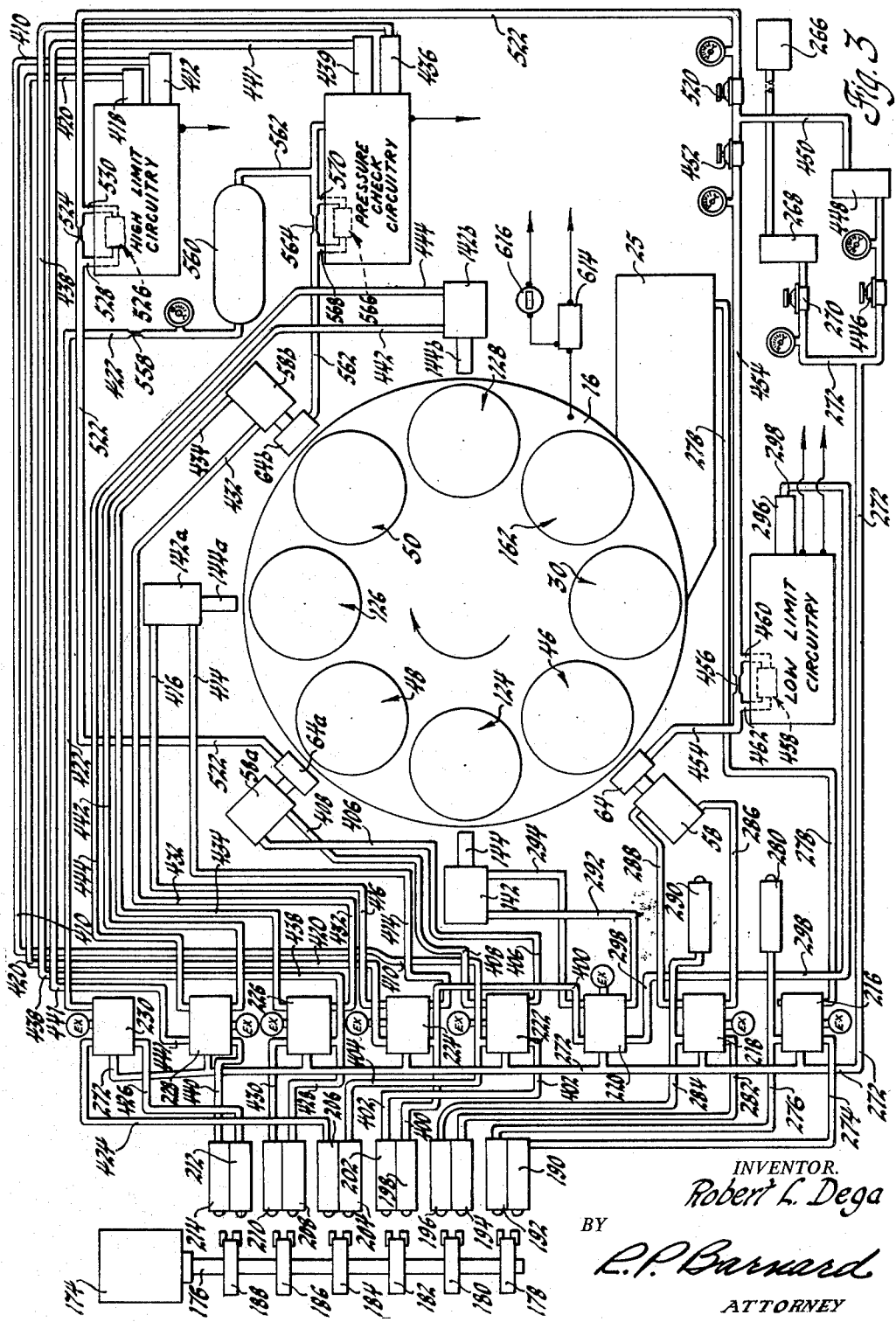
FIGURE 3 is a diagrammatic view of the control mechanism of the invention.

Referring now to FIGURE 3, the control circuitry for the aforedescribed apparatus is illustrated diagrammatically and comprises a conventional electro pneumatic timer 174 which drives a shaft 176 to which are secured a plurality of cam elements 178, 180, 182, 184, 186, 188.

Figure 8:
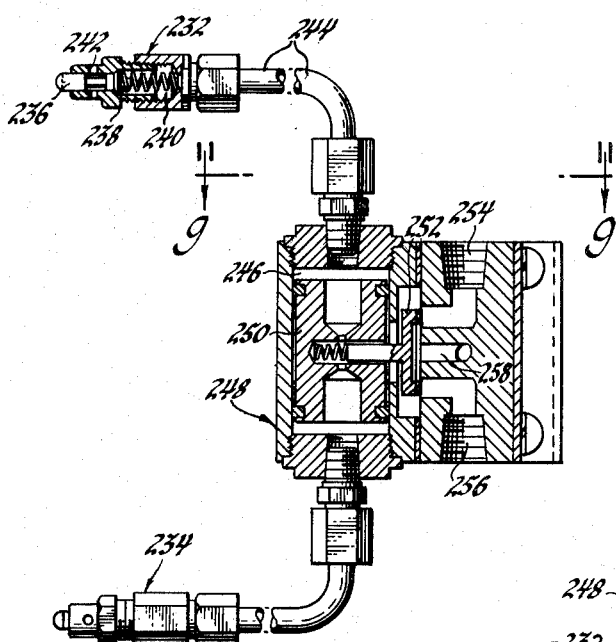
FIGURE 8 is a detail view partly in section of a valve mechanism of the present invention.
Figure 9:
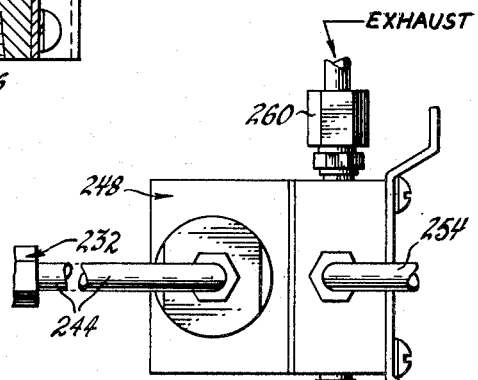
FIGURE 9 is a top view of the valve shown in FIGURE 8.

Portions of the cams are adapted to actuate associated finger-type exhaust valves 190, 192, 194, 196, 198, 202, 204, 206, 208, 210, 212, 214 in a predetermined manner. The finger-type exhaust valves control conventional four-way valves 216, 218, 220, 222, 224, 226, 228, 230 which direct the flow of high pressure air to actuate the various testing mechanisms. As shown in FIGURES 8 and 9, the aforementioned valves are conventional and comprise, as units, a pair of finger-type exhaust valves 232, 234 that have a valve spool 236 which is slidably actuable inwardly against the bias of a compression spring 238 to open a central cavity 240 to an exhaust port 242 so that air may be exhausted through a conduit 244 from a valve spool cavity 246 of a conventional four-way valve 248. A valve spool 250 is slidably actuable in response to actuation of one or the other of the valves 232, 234 to shift a slide valve 252 and alternately connect valve passages 254, 256 to a high pressure inlet passage 258 and an exhaust passage 260 as shown in FIGURE 9.

Referring again to FIGURE 3, a high pressure air source 266 provides air for the entire system at approximately 100 p.s.i. and is connected through a filter 268 and a pressure regulator valve 270, which reduces the pressure to approximately 40 p.s.i., to a conduit 272 that supplies air to the inlet ports of each of the four-way valves. Conduits 274, 276 connect the exhaust valves 190, 192 to the valve spool cavity of the four-way valve 216 and a conduit 278 is provided to convey high pressure air from the four-way valve 216 to the fluid actuable, rotary table, feed mechanism 25. In addition, a manually operable finger-type exhaust valve 280 is connected to the conduit 276. The exhaust valve 190 is the index control to direct actuating fluid to the feed mechanism 25 of the table 16 and the exhaust valves 192, 280 cut off flow of the actuating fluid to provide a predetermined indexing movement. A pair of conduits 282, 284 connect the exhaust valves 194, 196 to the four-way valve 218 which controls the passage of high pressure air to the air cylinder 58 at test station 46. A manually operable finger-type exhaust valve 290 is also connected to the conduit 284. Actuation of the exhaust valve 196 or 290 actuates the four-way valve in the aforedescribed manner to cause high pressure air to flow from the conduit 272 through a conduit 288 to the lower side of the air cylinder 58 whereby the testing gauge 64 will be retracted. Actuation of the exhaust valve 194 causes high pressure air to be supplied via the conduit 286 to the upper side of the air cylinder 58 to extend the gauging head 64 into contact with a test seal at the station 46. The exhaust valve 220 controls the flow of high pressure air to the ejection air cylinder 142 at station 124 via the conduits 292, 294. The valve 220 is controlled by an exhaust valve 296, which is responsive to circuitry associated with the gauge head 64 and hereinafter described in detail, through the conduit 298 and by the exhaust valve 198 through a conduit 400 which also communicates with the valve 224. Actuation of the exhaust valve 296 causes high pressure air to pass through the valve 220 from the conduit 272 through the conduit 292 to the air cylinder 142 to extend the rake 144. Actuation of the exhaust valve 198 causes high pressure air to pass from the conduit 272 through the valve 220 and the conduit 294 to the other side of the air cylinder 142 to retract the rake 144. The valve 222 is controlled by the exhaust valves 198, 202 through the conduits 400, 402 to cause high pressure air to pass from the conduit 272 through the valve 222 and the conduits 406, 408 to the air cylinder 58a at the test station 48. Actuation of the exhaust valve 202 causes high pressure air to flow from the conduit 272 through the valve 222 and the conduit 406 to the upper side of the air cylinder 58a to downwardly extend the gauging head 64a. Actuation of the exhaust valve 204 causes high pressure air to flow from conduit 272 through the valve 222 and the conduit 408 to the lower side of the air cylinder 58a to retract the gauging head 64a. Another conduit 410 provides a flow passage between the conduit 404 and a finger-type exhaust valve 412 which is actuable by circuitry associated with the gauging head 64a to maintain the gauge head 64a in the retracted position when no seal is therebeneath due to ejection at station 124. Flow of high pressure fluid from the conduit 272 through the valve 224 to the conduits 414, 416 is controlled by the exhaust valve 198 through the conduit 400 and by an exhaust valve 418, that is controlled by circuitry associated with the gauge head 64a, through a conduit 420. Actuation of the exhaust valve 198 causes high pressure air to flow from the conduit 272 through the valve 224 and the conduit 414 to the air cylinder 142a to maintain the rake 144a in a retracted position and actuation of the exhaust valve 418 causes high pressure air to flow from the conduit 272 through the valve 224 and the conduit 416 to the air cylinder 142a to extend the rake 144a. Air flow to gauge head 64b from a conduit 422 is controlled by the valve 230 which is actuable by the exhaust valves 206, 212 through the conduits 424, 426. Actuation of the exhaust valve 206 permits passage of high pressure air from the conduit 272 through the valve 230 to the conduit 422 and actuation of the exhaust valve 212 closes the valve 230 and prevents passage of air therethrough. Passage of high pressure air from the conduit 272 through the valve 226 is controlled by actuation of the exhaust valves 208, 210 through the conduits 428, 430 to alternately direct high pressure air through conduits 432, 434 to the air cylinder 58b. An exhaust valve 436, actuable by circuitry associated with the gauge head 64b, is connected by a conduit 438 to the conduit 420. Actuation of the exhaust valves 208 or 436 causes high pressure fluid to flow from the conduit 272 through the valve 226 and the conduit 432 to the air cylinder 58b to retract the gauge head 64b and actuation of the exhaust valve 210 causes high pressure air to flow from the conduit 272 through the valve 226 and the conduit 434 to the upper end of the air cylinder 58b to extend the gauge head 64b into engagement with a test seal at station 50. Flow through the valve 228 is controlled by the exhaust valve 214 and the exhaust valve 439 which is actuable by circuitry associated with the gauge head 64b, through the conduits 440 and 441. Actuation of the exhaust valve 214 causes flow of high pressure air from the conduit 272 through the valve 228 and through a conduit 442 to the air cylinder 142b at the ejection station 128 and actuation of the exhaust valve 439 causes high pressure flow from the conduit 272 through the valve 228 and a conduit 444 to the air cylinder 142b. Accordingly, actuation of the exhaust valve 214 causes retraction of the rake 144b and actuation of the exhaust valve 439 causes the rake 144b to be extended.

Figure 4:
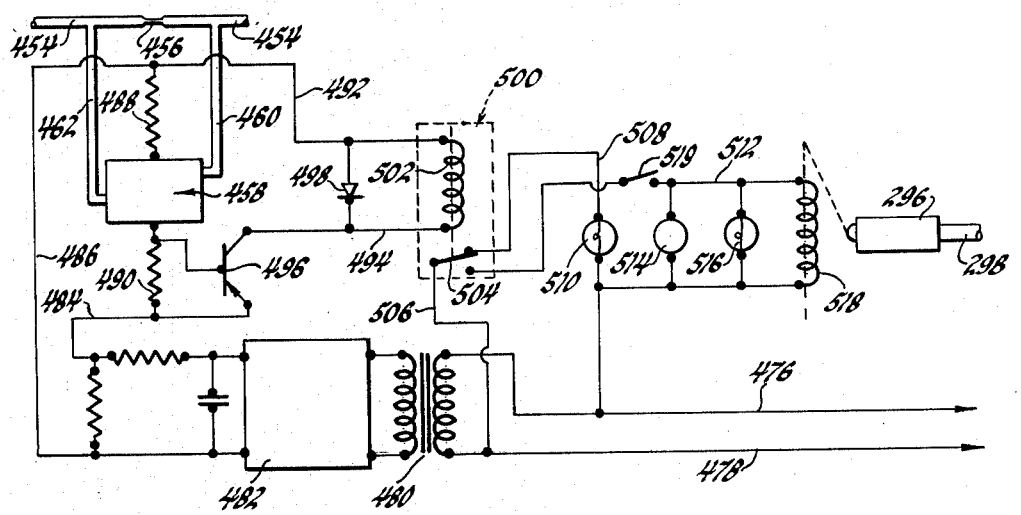
FIGURE 4 is a diagrammatic view of one portion of the electrical circuitry of the present invention.
Figure 10:
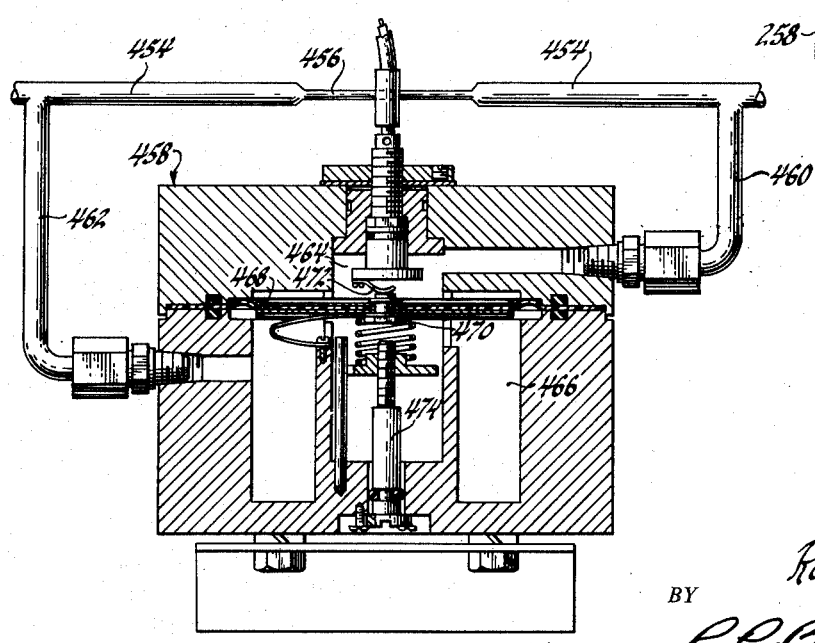
FIGURE 10 is a detail view partly in section of a comparator used with the present invention.

Air is supplied continually at a constant pressure to the gauge head 64 from the conduit 272 through a pressure regulator 446 and a filter 448 at a pressure of about 15 p.s.i. to a conduit 450, and subsequently through another pressure regulator 452 which further reduces the pressure of the air to about 0.5 p.s.i in a conduit 454 leading to the gauge head 64 through a small orifice 456. Referring now to FIGURE 10, the rate of flow of air past the orifice 456 is measured by a comparator of conventional design which is connected by conduits 460, 462 to the conduit 454 on opposite sides of the orifice 456. A similar comparator is used at each of the testing stations and since the structure is identical only the comparator 458 will be described in detail. In general, the comparator comprises an upper air chamber 464 and a lower air chamber 466 separated by a diaphragm member 468 which maintains a switch provided by a lower contact 470 and an upper contact 472 in a normally closed position as shown. An adjusting screw 474 permits adjustment of the comparator so that the diaphragm will be actuated at variable flow rates. Referring now to FIGURE 4, the low limit circuitry associated with the gauging head 64 is diagrammatically illustrated as comprising a pair of electrical connectors 476, 478 that are connected to a suitable power source. A transformer 480 and a rectifier 482 are provided in the circuit and a pair of electrical conductors 484, 486 extend therefrom through resistances 488, 490 to the electrical contacts 470, 472 in the comparator 458. Electrical conductors 492, 494 lead from the comparator through a transistor 496 and a diode 498 to a normally energized relay 500. When the relay is energized, the coil 502 thereof maintains a switch 504 in a circuit-closing position between an electrical conductor 506 and an electrical conductor 508 to normally energize a light 510 which indicates that an acceptable seal is being tested. When the relay is de-energized by separation of the contacts 470, 472 in the comparator 458 the switch 504 is actuated to a position completing a circuit between the electrical conductor 506 and an electrical conductor 512 which energizes a counter 514, a reject light 516 indicating an unacceptable seal is being tested and a solenoid 518 which actuates the exhaust valve 296. A normally open switch 519 prevents energization of the unacceptable seal circuitry until the gauge head 64 has been lowered and the Microswitch 120 actuated.

Figure 5:
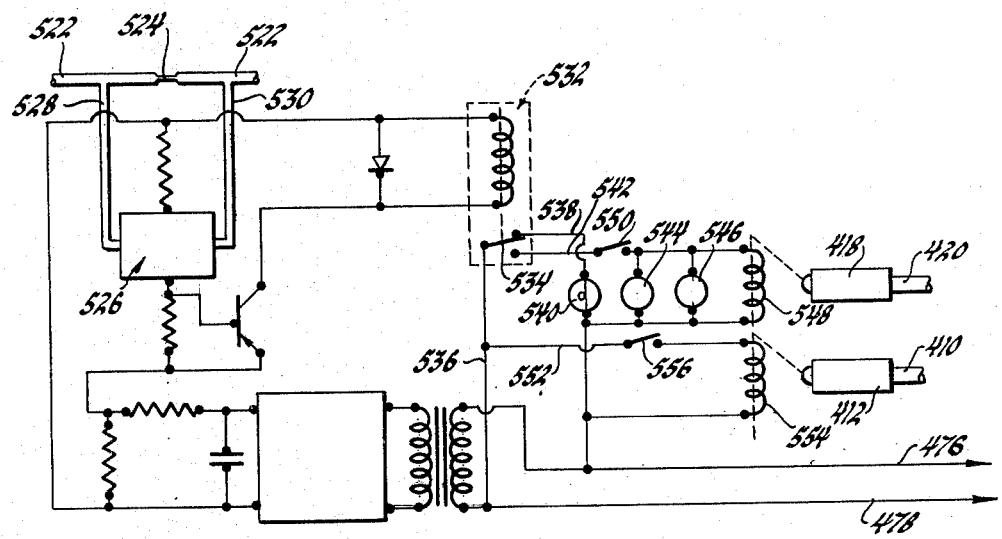
FIGURE 5 is a diagrammatic view of another portion of the electrical circuitry of the present invention.

Referring again to FIGURE 3 high pressure air is continually supplied to the gauge head 64a at a constant pressure from the conduit 450 through a pressure regulator 520 which reduces the pressure to approximately 0.5 p.s.i. and through a conduit 522 which includes an orifice 524 of small diameter. A comparator 526 identical to the comparator 458, is connected to the conduit 522 on opposite sides of the orifice 524 by conduits 528, 530. As shown in FIGURE 5 the circuitry associated with the comparator 526 for normally energizing a relay 532 is identical to the circuitry described in FIGURE 4. A switch 534 of the normally energized relay 532 is maintained in a circuit-closing position between an electrical conductor 536 and an electrical conductor 538 to energize a light 540 which indicates that an acceptable seal is being tested. When the relay 532 is de-energized the switch 534 moves to a circuit-closing position between the electrical conductor 536 and an electrical conductor 542 to energize a counter 544, a light 546 indicating that an unacceptable seal is being tested and a solenoid 548 which actuates the exhaust valve 418. A normally-open switch 550 interrupts the electrical conductor 542 and is actuable to a circuit-closing position by actuation of the Microswitch 120a when the gauge head 64a is in its extended position in engagement with a test seal at the station 48. Since air is continually supplied to the gauge head 64a and because a high rate of flow at the station 64a indicates an unacceptable seal and causes actuation of the ejection mechanism at station 126, the switch 550 is provided to prevent premature actuation of the ejection mechanism prior to engagement of the gauge head 64a with a test seal. An electrical conductor 552 is connected to the electrical conductor 536 to energize a solenoid 554 that controls an exhaust valve 412. A normally open switch 556 is actuable to a circuit-closing position by the Microswitch 158 so that when an unacceptable seal is measured at station 46 and ejected at station 124, the gauge head at station 48 will remain in the retracted position because actuation of the exhaust valve 412 exhausts air from the four-way valve 222 to direct high pressure air from the conduit 272 through the valve 222 and the conduit 408 to the lower side of the air cylinder 58a.

Figure 6:
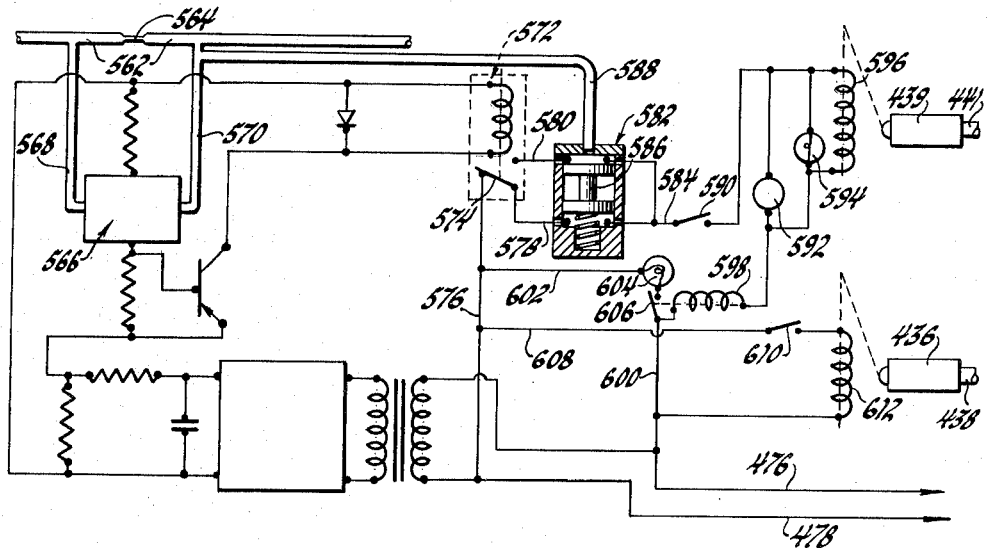
FIGURE 6 is a diagrammatic view of still another portion of the electrical circuitry of the present invention.

Referring again to FIGURE 3, high pressure air is supplied to the gauge head 64b from the conduit 422 through a small orifice 558 and through an accumulator 560 to a conduit 562 having a small orifice 564. A comparator 566, identical to the comparator 458, is connected to the conduit 562 on opposite sides of the orifice 564 by conduits 568, 570. As shown in FIGURE 6, the circuitry associated with the comparator 566 is identical to the circuitry associated with the comparator 458 and actuates a normally-energized relay 572. Energization of a coil 572 of the relay maintains a switch 574 in a circuit-closing position between an electrical conductor 576 and an electrical conductor 578. In the unenergized position, the switch 574 completes a circuit between the electrical conductor 576 and an electrical conductor 580. A pressure switch 582 of conventional design is adapted to alternately complete a circuit to the electrical conductor 584 through the conductors 578, 580. The pressure switch 582 includes a switch member 586 which is slidable between an upper position completing a circuit through the electrical conductor 580 and a lower position completing a circuit through the conductor 578. The switch member 586 is responsive to pressures in the conduit 562 through a conduit 588. Although the switch member 86 is adjustable to any pressure range, in the illustrative embodiment, the switch member 586 is maintained in the upper position by pressures in the conduit 562 from 0 to 5 p.s.i. and is maintained in the lower position by pressures in the conduits 562 of 7 p.s.i. or greater. Between the pressures of 5 p.s.i. and 7 p.s.i., the switch member 586 floats between the upper and lower positions so that neither of the circuits provided by the conductors 578, 580 are energized. When the switch of the comparator 566 is opened in response to a predetermined air flow through the orifice 564 and when the pressure in the conduit 562 is below 5 p.s.i., the switch 574 is moved into a circuit-closing position between the electrical conductor 576 and the electrical conductor 580 to complete a circuit through the switch 586 to the electrical conductor 584 which causes energization of a counter 592, a light 594 indicating that an unacceptable seal is being tested and a solenoid 596 which actuates an exhaust valve 439 to extend the rake 144a at the ejection station 128. A normally-open switch 590 completes the unacceptable seal circuit through the conductor 584 and is actuable to a closed position in response to actuation of a Microswitch 120b mounted adjacent the upper end of the piston rod associated with the air cylinder 58b at station 50 in a manner similar to the actuation of the Microswitch 120 by the cam disc 118 of air cylinder 58. In this manner, the ejection circuitry cannot be actuated until the gauge head 64b is in the extended testing position circumjacent a test seal. A relay coil 598 is also energized through the conductor 584 and a conductor 600 completes the circuit back to the conductor 476. An electrical conductor 602 completes a circuit between the conductor 576 and the conductor 600 to normally energize light 604 indicating an acceptable seal is being tested. A normally-closed switch 606 is controlled by the relay coil 598 so that when the ejection (unacceptable seal) circuit is energized the switch 606 is moved to an open position to de-energize a light 604. Another conductor 608 completes a circuit from a conductor 576 to the conductor 600 through a switch 610 to energize a solenoid 612 which actuates an exhaust valve 436 to exhaust fluid through the conduit 438 from the four-way valve 226 and cause high pressure air to flow from the conduit 272 through the valve 226 and the conduit 432 to the air cylinder 58b to retract the gauge head 64b. The normally-open switch 610 is closed in response to actuation of the Microswitch 160 as the table 16 is rotated by the absence of a test seal due to ejection at the station 126. In this manner the gauge head 64b is retained in the retracted position when no test seal is therebeneath. As shown in FIGURE 3 a Microswitch 614 is actuable by test seals as they are rotated from the station 128 to the station 162 to actuate a counter 616 which records the number of acceptable seals tested.

*Operation*

In operation of the subject device, the correct size stub test shafts are first placed in the gauge heads 64, 64a, 64b and the comparators 458, 526 and 566 are adjusted to open the associated switches at a predetermined rate of flow of air through the respective gauge heads and past the flexible lip of the seal being tested. As an example, the comparator 458 may be adjusted to actuate its switch at a flow rate of 10,000 cc. m., the comparator 526 may be adjusted to actuate its switch at a flow rate of 15,000 cc. m.

and the comparator 566 may be adjusted to actuate its switch at a flow rate of 5,000 cc. m. After the various regulator valves have been adjusted to give the desired air pressures in the various conduits, the particular size seal to be tested may be loaded at station 30 into the loading chute defined by the rods 32, 34, 36 and the loading port 44 in the bracket 38. Then, when the timing mechanism 174 is actuated, each of the test seals will be moved from station to station in a predetermined manner after being loaded onto the indexable table over one of the through holes 18 and within the corresponding recess 28 as the through hole becomes aligned beneath the loading port 44. By actuation of the table indexing valve 190 by the cam 178 high pressure fluid is directed to the fluid actuable feed mechanism 25 through the four-way valve 216 and through conduit 278. When the table has indexed the proper amount, in this case 45 degrees to the station 46, the flow cut-off valve 192 is actuated to stop the flow of fluid to the feed mechanism 25. At this time, the gauge head lowering valve 194 is actuated to cause high pressure air to flow through the valve 218 to the upper end of the air cylinder 58 and to cause the gauge head 64 to be lowered into engagement with the test seal as shown in FIGURE 7. The test seal 98 is positioned within the seal cavity 96 of the air head 64 and the sealing lip 102 is engageable with the stub test shaft 82. Air is continuously supplied to the cavity 90 in the air head at a constant pressure of 0.5 p.s.i. and the cavity 90 is sealed by the O-ring 108, the gasket 106 and the action of the compression spring 110. Thus, air flow is confined to a path through the passage 104, along the periphery of the stub test shaft 82, past the flexible lip 102 and through the hole 18 in table 16. The comparator 458 measures flow rate through the gauge head 64 and is adjusted to maintain the associated switch in a normally-closed position for flow rates above a predetermined flow rate such as 10,000 cc. m. The stub shaft 82 at station 46 is a minimum-sized or low limit test shaft. If the test seal has too small a diameter and/or a binding eccentricity, the flow rate through the gauging head will be reduced below the preset 10,000 cc. m. and the test seal will be unacceptable. An acceptable seal will permit the flow of air at a rate exceeding 10,000 cc. m.

Referring now to FIGURE 4, the switch of the comparator 458 is normally closed to energize the relay 500 and maintain the switch 504 in the upper position closing the circuit between conductors 506, 508 and energizing the light 510 to indicate the presence of a good seal. When an unacceptable seal is measured and reduces the flow rate to less than 10,000 cc. m. the switch of the comparator is opened and the relay 500 is de-energized to move the switch 504 to the lower position to close a circuit from the electrical conductor 506 to the conductor 512 to energize the counter 514, the light 516 indicating an unacceptable seal and to energize the solenoid 518 which actuates the exhaust valve 296 and causes the rake 144 at station 124 to be extended radially inwardly of the table 16 past the inner surface of the recess 28. The finger of the rake is outwardly pivotally supported so that when a seal is in the recess 28 at the station 124, the rake will be movable to the extended position without disturbing the seal. The index valve 190 then rotates the table 16 and the test seal another 45 degrees to the station 124. At this time, the rake retracting valve 198 is actuated to cause high pressure air to flow from the conduit 272 through the valve 220 and the conduit 294 to the air cylinder 142 to retract the rake 144 which removes the test seal from the table 16 onto the ejection chute 130. If the seal tested at station 46 was found to be acceptable then the rake would not have been extended and the test seal would not be removed at station 124. If the test seal was unacceptable and removed at the station 124 by the rake 144 actuation of a Microswitch 158, shown in FIGURE 1, by the absence of a test seal as the table is indexed will prevent actuation of the gauging mechanism at station 48 by closing the switch 556, shown in FIGURE 5, to energize the solenoid 554 and actuate the exhaust valve 412 which causes high pressure air to flow from the conduit 272 through the valve 222 and the conduit 408 to the lower side of the air cylinder 58a to maintain the gauge head 64a in a retracted position. If a seal is found to be acceptable at test station 46, it is indexed in two steps to the station 48; at which time, the gauge head extending valve 202 is actuated by the timing mechanism to cause high pressure air to flow from the conduit 272 through the valve 222 and the conduit 406 to the upper end of the air cylinder 58a which extends the gauge head 64a into engagement with the test seal. Air at a pressure of approximately 0.5 p.s.i. is continuously supplied to the gauge heads 64a through the conduit 522 and the rate of flow of air through the gauge head is measured by the comparator 526. A maximum-sized or high limit test shaft is associated with the gauge head 64a and an acceptable seal in engagement therewith will not permit the flow rate to exceeed a predetermined figure; such as 15,000 cc. m. Accordingly, the comparator 526 is adjusted so that a flow rate in excess of 15,000 cc. m. will open the normally-closed contacts associated therewith. As shown in FIGURE 5, an acceptable seal causing a flow rate less than 15,000 cc. m. causes the relay 532 to remain energized to maintain the switch 534 in the upper position completing a circuit between the conductor 536 and the conductor 538 to energize the light 540 which indicates the presence of an accepable seal. If the flow rate exceeds the predetermined figure, the comparator will be actuated to de-energize the relay 532 and the switch 534 will be moved to the lower position to complete a circuit from the conductor 536 through the conductor 542 to energize the unacceptable seal circuitry. In this manner, the counter 544, the light 546 indicating the presence of an unacceptable seal and the solenoid 548, which actuates the valve 418 to allow high pressure air from the conduit 272 to flow through the valve 224 and the conduit 416 to the air cylinder 142a to extend the rake member 144a radially inwardly over the station 126, are energized. Since air is continually fed through the gauge head 64a there will normally be a flow rate in excess of 15,000 cc. m. passing through the gauge head. In order to prevent energization of the unacceptable seal circuitry except during an actual measurement, the normally-open switch 550 is positioned in the circuit and is adapted to be closed in response to actuation of the Microswitch 120 by the cam disc 118 as the piston rod 62 is actuated downwardly to position the gauge head 64a in measuring contact with the test seal. In this manner, the unacceptable seal circuitry can only be energized when the gauge head is in measuring position circumjacent a test seal.

The next indexing movement of the table 16 in response to actuation of the valve 190 causes the test seal to be rotated to station 126 whereat the seal is removed from the table by actuation of the rake retracting valve 198 to permit high pressure air to flow from the conduit 272 through the valve 224 and the conduit 414 to the air cylinder 142a to retract the rake 144a, which has previously been extended by measurement at station 48 indicating an unacceptable seal. The unacceptable seal is raked from the station 126 onto an ejection chute 132. The next indexing movement of the table 16, causing movement of a test seal from the station 126 to the station 50, will cause actuation of the Microswitch 160 if the test seal has been previously found unacceptable and raked off of the table. The switch 610, shown in FIGURE 6, is closed in response to actuation of Microswitch 160 to energize the solenoid 612 and actuate the gauge head retracting valve 436 to cause flow of high pressure air from the line 272 through the valve 226 and the conduit 432 to the lower side of the air cylinder 58b to maintain the gauge head 64b in a retracted position.

If a test seal has been found acceptable at test stations 46, 48, it will be indexed to station 50 for a lip pressure check. The test shaft in the gauge head 64b at station 50 has a test shaft diameter equal to the nominal size of the shaft with which the test seal is to be associated in production usage. The gauge head extending valve 210 is actuated by the timing mechanism to cause the flow of high pressure air from the conduit 272 through the valve 226 and the conduit 434 to the upper end of the air cylinder 58b to cause the gauge head 64b to be extended downwardly into engagement with the top surface of the test seal thereunder. Then the valve 212 is actuated by the timing mechanism to cause high pressure air to flow from the conduit 272 through the valve 230, the conduit 422, the accumulator 560 and the conduit 562 to the gauge head 64b at an increasing pressure. The comparator 566 measures air flow past the orifice 564 in the conduit 562 and is adjusted so that the normally-closed contacts of the comparator are opened in response to fluid flow in excess of a predetermined flow rate, such as 5,000 cc. m. Referring now to FIGURE 6, the relay 572 is normally energized and maintains the switch 574 in the lower position to complete a circuit from the conductor 576 to the conductor 578. When the rate of flow past the orifice 564 is in excess of 5,000 cc. m., the relay 572 is de-energized and the switch 574 is moved to the upper position to complete a circuit from the conductor 576 to the conductor 580. A pressure valve 582 controls a switch 586 which completes circuits through the conductors 578, 580 in response to the pressure in the conduit 562. In this manner, the switch 586 is movable between a position completing a circuit through the conductor 580 to a position completing a circuit through the conductor 578. As the pressure in the line 562 is gradually increased, the switch 586 moves from the upper position at a predetermined pressure of, for example, five pounds, and will be moved to the lower position at a predetermined pressure of, for example, seven pounds. A light 605 indicating the presence of an acceptable seal is normally energized by current flowing from the conductor 576 and through the conductor 602, the switch 606 and the conductor 600. When the gauge head 64b has been lowered into contact with a test seal at station 50, the switch 590 is closed by actuation of a Microswitch 120b which is controlled by the position of the upper end of the piston rod associated with air cylinder 58b in a manner identical to the previously described actuation of Microswitch 120a associated with the air cylinder 58a. If the flow rate remains below 5,000 cc. m. below a pressure of five pounds, the switch 574 will be in the lower position and the switch 586 will be in the upper position so that the conductor 584 and the unacceptable circuitry will remain de-energized. If the flow rate exceeds 5,000 cc. m. at five pounds of pressure or less, the comparator will be actuated to de-energize the relay 572 and move the switch 574 to the upper position. In this manner, a circuit is completed from the conductor 576 through the conductor 580, the switch 586 and the conductor 584, to energize the counter 592, the light 594 indicating the testing of an unacceptable seal and the solenoid 596 which actuates the valve 439 to extend the rake 144b at station 128. When the pressure in the conduit 562 is above five p.s.i. and below seven p.s.i., the switch 586 floats between the upper and lower circuit-closing positions so that the rate of flow during this period has no effect on the unacceptable seal circuitry. In fact, the flexible lips of acceptable seals will be forced outwardly away from the test shaft in the gauge head 64b during the pressure interval between five pounds and seven pounds so that the flow rate will exceed 5,000 cc. m. and the comparator 566 will be actuated. If the flexible lip does not permit fluid flow during the aforementioned interval to cause the relay 572 to remain energized and the switch 574 to remain in the lower position connecting the conductors 576, 578, then, when the switch 586 is moved to the lower position at seven p.s.i., the conductor 584 will be energized to actuate the counter 592, the light 594 and the solenoid 596 to indicate the presence of an unacceptable seal and to actuate the ejection mechanism at station 128. In order to de-energize the light 604 which indicates the presence of an acceptable seal a relay 598 is energized whenever the unaccepable seal circuitry is energized to open a switch 606 in the light circuitry. When the testing operation at station 50 is completed, the timer mechanism actuates the gauge head retracting valve 208 to permit flow of high pressure air from the conduit 272 through the valve 226 and the conduit 432 to the air cylinder 58b to retract the gauge head 64b. The table 16 is then indexed another 45 degrees by actuation of the index valves 190, 192 to move the test seal to station 128 whereat the rake 144b is retracted by actuation of the rake retraction valve 214 to allow flow of high pressure air from the conduit 272 through the valve 228 and the conduit 442 to the air cylinder 142b. In this manner, if a seal was found to be unacceptable at the station 50 and the rake 144b extended, the unacceptable seal will be raked off of the table at station 128 onto the ejection chute 134. If the seal was found to be acceptable at station 50, the rake 144b remains in the retracted position and the seal will be eventually indexed to station 162 where the spring ejection arm 166 will force the test seal from the table and onto the ejection chute 164 as the table is indexed from station 162 to station 30. The counter 616 is actuated by the Microswitch 614 as each acceptable seal passes thereby. Suitable receptacles are placed adjacent each of the ejection chutes 130, 132, 134, 164 to receive ejected seals.

Although the aforedescribed illustrative embodiment utilizes air as the actuating fluid, other fluids and other fluid actuable mechanisms which perform the same functions may be utilized. Likewise, several of the actuating mechanisms may be replaced by electrical counterparts and the electrical components may obviously be rearranged and revised without changing the basic function of the apparatus. Accordingly, it is recognized that the illustrative embodiment is susceptible of many modifications in the details of construction and arrangement of the parts within the spirit and scope of this invention as defined by the appended claims.

I claim:

1. Apparatus for testing the sealing qualities of annular seals having a flexible lip adapted for engagement with a shaft and comprising conveyor means, drive means for indexably actuating said conveyor means, seal retaining means provided on said conveyor, seal loading means to position test seals on said seal retaining means, a plurality of testing stations positioned closely adjacent said conveyor to accommodate test seals upon indexing of said conveyor, a test shaft provided each for a separate testing purpose at each of said testing stations, means to position successively each of said test shafts in sealing relationship with said seals to measure a particular characteristic of sealing quality of said seals at each of said stations, and means to eject unacceptable seals as determined by said test shafts from said conveyor means as said seals are moved between testing stations.

2. Apparatus for testing the sealing qualities of annual seals having a flexible lip adapted for engagement with a shaft or the like, and comprising, a rotary support table, individual seal retaining means provided on said table, seal loading means positioned adjacent said table to provide a loading station and cooperable with said seal retaining means to position individual seals thereon, a plurality of gauging shafts each for a separate testing purpose mounted adjacent to and peripherally spaced about said rotary table to provide a plurality of testing stations to accommodate test seals upon indexing of said conveyor, successively actuated, power means associated with each of said gauging shafts for causing movement thereof from a retracted position to a position in sealing relationship with the individual test seals, measuring means connected to said gauging shafts to measure a particular characteristic of sealing quality of the test seals at each of said stations, ejection mechanisms provided for each of said gauging shafts and being actuable to remove unacceptable test seals from said rotary table; power feed mechanism to rotatably index said table from said loading station to each of said testing stations, a control timer, and control apparatus actuable by said timer to indexably rotate said rotary table and to actuate said gauging shafts and to actuate said ejection mechanisms to remove unacceptable seals as determined by said gauging shafts.

3. Seal testing apparatus comprising, a source of high pressure fluid, fluid pressure control means to maintain said fluid at predetermined pressures, seal supporting means, seal gauging mechanism comprising a minimum diameter gauging shaft and a maximum diameter gauging shaft, gauging mechanism control means to position a test seal carried by said supporting means alternately circumjacent said minimum shaft and said maximum shaft in a fluid seal testing position, a fluid conduit connecting said source and said seal gauging mechanism, fluid flow directing means associated with said gauging mechanism to direct fluid flow therefrom axially along said minimum shaft and said maximum shaft and through said fluid seal, fluid flow rate measuring means, seal ejection means, and ejection means control apparatus operably connected in said ejection means and being actuable by said measuring means, said control apparatus being actuable in response to predetermined flow rates through said measuring means when said gauging mechanism is in the seal testing position to actuate said seal ejection means and remove unacceptable fluid seals from said seal supporting means.

4. Seal testing apparatus comprising, a source of high pressure fluid, fluid pressure control means to maintain said fluid at predetermined pressures, seal supporting means, seal gauging mechanism comprising a minimum diameter gauging shaft and a maximum diameter gauging shaft and a seal engagement-pressure gauging shaft, gauging mechanism control means to position a test seal carried by said supporting means alternately circumjacent said minimum shaft and said maximum shaft and said seal engagement-pressure gauging shaft in a fluid seal testing position, a fluid conduit connecting said source and said gauging mechanism, fluid flow directing means associated with said gauging mechanism to direct fluid flow therefrom axially along the gauging shafts and through said fluid seal, flow rate measuring means, seal ejection means, and ejection means control apparatus operably connected to said ejection means and actuably connected to said measuring means, said control apparatus being actuable in response to predetermined flow rates through the test seal when said gauging mechanism is in the fluid seal testing position to actuate said seal ejection means and remove unacceptable seals from said seal supporting means.

5. Seal testing apparatus comprising, a source of high pressure fluid, fluid pressure control means to maintain said fluid at predetermined pressures, a fluid delivery system; test seal supporting means comprising: and indexable rotary table, test seal seats provided on said table, each of said seats including a central flow port and being dimensioned to retain a test seal circumjacent said flow port; test seal gauging mechanism comprising: a test shaft, a fluid conduit connected to said source and said gauging mechanism, fluid flow directing means supported circumjacent said test shaft, a test seal accommodating cavity formed in said fluid flow directing means; seal gauging mechanism control means operably connected to said gauging mechanism and being actuable to position a test seal carried on said seats circumjacent and in sealing relationship to said test shaft and within said cavity in a seal testing position; packing means within said cavity to confine fluid flow to a flow path through said fluid flow directing means and axially along said test shaft and past said test seal to said central flow port; fluid flow rate measuring means connected to said conduit; test seal ejection means; and ejection means control apparatus operably connected to said ejection means and actuably connected to said measuring means, said control apparatus being actuable in response to predetermined flow rates past said test seal and through said central flow port to actuate said seal ejection means and remove unacceptable seals from said seal supporting means.

6. Seal testing apparatus comprising: an indexable rotary table having a plurality of circumferentially spaced fluid flow ports, a test seal retaining seat formed circumjacent to each of said flow ports, an ejection guide-way opening radially outwardly from and intersecting each of the test seal retaining seats; fluid actuable feet mechanism drivingly associated with said table; fluid flow control means associated with said feed mechanism to control flow of actuating fluid thereto and to cause indexable rotation of said table in a predetermined manner between a plurality of work stations, said work stations being circumferentially spaced adjacent said table at index points along the path of movement thereof; a test seal loading chute, said loading chute being vertically spaced above said table and aligned with each of the seal retaining seats to deposit a test seal thereon as said table is rotated to position an empty seal retaining seat thereunder; said work stations comprising in sequence and alternately along the path of movement of said table testing stations and ejection stations; each of said testing stations comprising: a gauging head, a test shaft carried by said gauging head, fluid conveying means connected to said gauging head to supply fluid thereto at a predetermined pressure, a gauging head control mechanism actuable to move said gauging head to a seal testing position of sealing association with a test seal carried by one of said seal retaining seats, said test seal being positioned circumjacent said test shaft in said testing position, fluid flow directing means provided in said gauging head to confine fluid flow to a path between said test shaft and said test seal and through the associated flow port in said table; fluid flow rate measuring apparatus associated with said gauge head; each of said ejection stations comprising: ejection mechanism having a rake member, said rake member being actuable by ejection mechanism control means controllably connected to said ejection mechanism between an extended position radially inwardly spaced relative to said table beyond the test seal retaining seats and a retracted position radially outwardly spaced relative to the periphery of said table, an ejection chute positioned radially outwardly of and adjacent said table beneath the path of movement of said rake between the extended position and the retracted posion, said ejection mechanism control means being connected to said measuring apparatus and actuable thereby in response to predetermined rates of fluid flow between said test shaft and the test seal in said testing position to move said rake to the extended position; timer means controllably connected to said fluid flow control means to cause indexing movement of said table and move said test seal from the testing station to the ejection station after a predetermined testing interval; said ejection mechanism control means being actuable to move the rake to the retracted position after indexing movement of said test seal from the test station to the ejection station to remove said test seal radially outwardly through said guide-way opening and onto said chute; a discharge chute for acceptable seals spaced further along the path of movement of said table subsequent to said work stations; a spring arm extending radially outwardly of and spaced closely adjacent the top surface of said table, said arm being positioned in alignment with said discharge chute and being engageable with acceptable test seals on the seal retaining seats rotated thereunder to force said seals radially outwardly through said guide-way opening and onto said discharge chute.

7. Seal testing apparatus comprising: an indexable rotary table, fluid actuable feed mechanism drivingly connected to said table, test seal supporting means provided on and circumferentially spaced around said table, a test seal loading station and a plurality of seal testing and ejection stations and an acceptable test seal ejection station, said feed mechanism being actuable to provide rotary indexing movement of said table from said loading station to each of said testing and ejection stations and subsequently to said acceptable seal ejection station in a repetitive testing cycle, loading means to position a test seal on each of said test seal supporting means at said loading station, a high pressure fluid source, a first inlet conduit extending from said fluid source, pressure regulating means provided in said inlet conduit, a plurality of fluid distribution valves connected to said inlet conduit, a plurality of control valves controllably connected to said fluid distribution valves, timing mechanism controllably connected to said control valves, one of said distribution valves being controllably connected to a servomotor mechanism at each of said testing and ejection stations, a gauge head being actuably connected to each of the testing station servomotor mechanisms and actuable thereby between a retracted position and a seal testing position, an ejection member actuably connected to each of the ejection station servomotor mechanisms and being actuable thereby between a retracted position and an ejection position, a hydraulic-electrical control circuit associated with each of said testing stations and comprising for each testing station: a guage head control valve actuable by said timer mechanism to actuate the testing station servomotor to the seal testing position, a fluid conduit extending from said inlet conduit to said gauge head, pressure regulating means in said fluid conduit to maintain a constant pressure at said gauging head, an orifice of reduced diameter in said conduit between said pressure regulating means and said gauging head, a fluid flow rate measuring device connected to said fluid conduit adjacent said orifice, an electric circuit, a control switch in said circuit being actuable by said measuring device in response to predetermined flow ratees through said orifice, relay means responsive to actuation of said control switch, an unacceptable seal circuit controlled by said relay means and being energized thereby in response to the predetermined flow rate through said orifice, a counter and a signal light and solenoid means provided in said unacceptable seal circuit, said solenoid means being controllably associated with an ejection control valve, said ejection control valve being actuable by said solenoid means to actuate the subsequent ejection station servomotor mechanism to the ejection position, another gauge head control valve actuable by said timing mechanism to actuate said testing station servomotor mechanism to the retracted position, a feed mechanism control valve being actuable by said timer mechanism to actuate said feed mechanism and index said table to the subsequent ejection station after a predetermined testing interval, another ejection control valve being actuable by said timing mechanism to actuate said ejection station servomotor mechanism to the retracted position and thereby remove the test seal from said table, and ejection means provided at said acceptable seal ejection station to remove acceptable seals from said table.

8. Seal testing apparatus comprising: an indexable rotary table, fluid actuable feed mechanism drivingly connected to said table, test seal supporting means provided on and circumferentially spaced around said table, a test seal loading station and a plurality of seal testing and ejection stations and an acceptable test seal ejection station, said feed mechanism being actuable to provide rotary indexing movement of said table from said loading station to each of said testing and ejection stations and subsequently to said acceptable seal ejection station in a repetitive testing cycle, loading means to position a test seal on each of said test seal supporting means at said loading station, a high pressure fluid source, a first inlet conduit extending from said fluid source, pressure regulating means provided in said inlet conduit, a plurality of fluid distribution valves connected to said inlet conduit, a plurality of control valves controllably connected to said fluid distribution valves, timing mechanism controllably connected to said control valves, one of said distribution valves being controllably connected to a servomotor mechanism at each of said testing and ejection stations, a gauge head being actuably connected to each of the testing station servomotor mechanisms and actuable thereby between a retracted position and a seal testing position, an ejection member actuably connected to each of the ejection station servomotor mechanisms and being actuable thereby between a retracted position and an ejection position, a hydraulic-electrical control circuit associated with each of said testing stations and comprising for each testing station: a gauge head control valve actuable by said timer mechanism to actuate the testing station servomotor to the seal testing position, a fluid conduit extending from said inlet conduit to said gauge head, pressure regulating means in said fluid conduit to maintain a constant pressure at said gauging head, a fluid flow rate measuring device connected to said fluid conduit, an electric circuit, a control switch in said circuit being actuable by said measuring device in response to predetermined flow rates through said fluid conduit, relay means responsive to actuation of said control switch, an unacceptable seal circuit controlled by said relay means and being energized thereby in response to the predetermined flow rate through said fluid conduit, solenoid means provided in said unacceptable seal circuit, said solenoid means being controllably associated with an ejection control valve, said ejection control valve being actuable by said solenoid means to actuate the subsequent ejection station servomotor mechanism to the ejection position, another gauge head control valve actuable by said timing mechanism to actuate said testing station servomotor mechanism to the retracted position, a feed mechanism control valve being actuable by said timer mechanism to actuate said feed mechanism and index said table to the subsequent ejection station after a predetermined testing interval, another ejection control valve being actuable by said timing mechanism to actuate said ejection station servomotor mechanism to the retracted position and thereby remove the test seal from said table, and ejection means provided at said acceptable seal ejection station to remove acceptable seals from said table.

9. The apparatus as defined in claim 8 and having control means to prevent energization of said unacceptable seal circuit unless said gauging head is in said seal testing position.

10. Seal testing apparatus comprising: an indexable rotary table, fluid actuable feed mechanism drivingly associated with said table, test seal supporting means provided on and circumferentially spaced around said table, a test seal loading station and a seal testing station, and an unacceptable seal ejection station and an acceptable seal ejection station spaced in sequence circumjacent said table, said feed mechanism being actuable to rotatably index said table from station to station in a repetitive testing cycle, test seal loading means to position a test seal on each of said seal supporting means at said loading station, a high pressure fluid source, an inlet conduit extending from said fluid source, pressure regulating means provided in said inlet conduit, a servomotor mechanism provided at said testing station and another servomotor mechanism provided at said unacceptable seal ejection station, a fluid distribution valve provided for each of the servomotor mechanisms and each distribution valve being connected to said inlet conduit, a plurality of control valves controllably connected to each distribution valve, timing mechanism controllably associated with said control valves to cause actuation of said servomotor mechanisms in a predetermined manner, a gauge head connected to the testing station servomotor mechanism and movably actuable thereby between a retracted position and a seal testing position, an ejection mechanism connected to the ejection station servomotor mechanism and movably actuable thereby between a retracted position and an ejection position, a hydraulic-electrical control circuit associated with said testing station and comprising: a gauge head control valve actuable by said timer mechanism to actuate the testing station servomotor and move said gauge head to the seal testing position, a fluid conduit extending from said inlet conduit to said gauge head, pressure regulating means in said fluid conduit to maintain a constant pressure in said fluid conduit, an orifice of reduced diameter in said fluid conduit between said pressure regulating means and said gauge head, fluid flow directing means provided by said gauge head to direct fluid flow past said test seal in the testing position in a predetermined manner, a fluid flow rate measuring device connected to said fluid conduit on opposite sides of said orifice, an electric circuit, a control switch in said circuit and being controllably connected to said measuring device and actuable thereby in response to predetermined flow rates past said test seal in the testing position, relay means responsive to actuation of said control switch, an unacceptable seal circuit controlled by said relay means and being energized thereby in response to the predetermined flow rates, a counter and a signal light and solenoid means provided in said unacceptable seal circuit, said solenoid means being controllably associated with an ejection control valve, said ejection control valve being controllably connected to an ejection station distribution valve to cause actuation of said testing station servomotor mechanism and move said ejection mechanism to the ejection position in response to the predetermined flow rates, another gauge head control valve actuable by said timing mechanism to cause actuation of said testing station servomotor mechanism and move said gauge head to the retracted position after a predetermined testing interval, a feed mechanism control valve controllably connected to feed mechanism and actuable by said timer mechanism to cause said table to be indexed to the unacceptable seal ejection station after said predetermined testing interval, another ejection control valve controllably connected to said ejection station servomotor mechanism and actuable by said timing mechanism after indexing movement of said table to said unacceptable seal ejection station to actuate said ejection station servomotor mechanism and move said ejection mechanism to the retracted position and thereby remove the test seal from said table, and acceptable seal ejection mechanism to remove acceptable seals at said acceptable seal ejection station.

11. Seal testing apparatus comprising: an indexable rotary table, fluid actuable feed mechanism drivingly associated with said table, test seal supporting means provided on and circumferentially spaced around said table, a test seal loading station and a seal testing station, and an unacceptable seal ejection station and an acceptable seal ejection station spaced in sequence circumjacent said table, said feed mechanism being actuable to rotatably index said table from station to station in a repetitive testing cycle, test seal loading means to position a test seal on each of said seal supporting means at said loading station, a high pressure fluid source, an inlet conduit extending from said fluid source, pressure regulating means provided in said inlet conduit, a servomotor mechanism provided at said testing station and another servomotor mechanism provided at said unacceptable seal ejection station, a fluid distribution valve provided for each of the servomotor mechanisms and each distribution valve being connected to said inlet conduit, a plurality of control valves controllably connected to each distribution valve, timing mechanism controllably associated with said control valves to cause actuation of said servomotor mechanisms in a predetermined manner, a gauge head connected to the testing station servomotor mechanism and movably actuable thereby between a retracted position and a seal testing position, an ejection mechanism connected to the ejection station servomotor mechanism and movably actuable thereby between a retracted position and an ejection position, a hydraulic-electrical control circuit associated with said testing station and comprising: a gauge head control valve actuable by said timer mechanism to actuate the testing station servomotor and move said gauge head to the seal testing position, a fluid conduit extending from said inlet conduit to said gauge head, pressure regulating means in said fluid conduit to maintain a constant pressure in said fluid conduit, fluid flow directing means provided by said gauge head to direct fluid flow past said test seal in the testing position in a predetermined manner, a fluid flow rate measuring device connected to said fluid conduit, an electric circuit, a control switch in said circuit and being controllably connected to said measuring device and actuable thereby in response to predetermined flow rates past said test seal in the testing position, relay means responsive to actuation of said control switch, an unacceptable seal circuit controlled by said relay means and being energized thereby in response to the predetermined flow rates, solenoid means provided in said unacceptable seal circuit, said solenoid means being controllably associated with an ejection control valve, said ejection control valve being controllably connected to an ejection station distribution valve to cause actuation of said testing station servomotor mechanism and move said ejection mechanism to the ejection position in response to the predetermined flow rates, another gauge head control valve actuable by said timing mechanism to cause actuation of said testing station servomotor mechanism and move said gauge head to the retracted position after a predetermined testing interval, a feed mechanism control valve controllably connected to feed mechanism and actuable by said timer mechanism to cause said table to be indexed to the unacceptable seal ejection station after said predetermined testing interval, another ejection control valve controllably connected to said ejection station servomotor mechanism and actuable by said timing mechanism after indexing movement of said table to said unacceptable seal ejection station to actuate said ejection station servomotor mechanism and move said ejection mechanism to the retracted position and thereby remove the test seal from said table, and acceptable seal ejection mechanism to remove acceptable seals at said acceptable seal ejection station.

12. The apparatus as defined in claim 11 and having control means to prevent energization of said unacceptable seal circuit unless said gauging head is in said seal testing position.

13. Seal testing apparatus comprising, an indexable rotary table, fluid actuable feed mechanism drivingly associated with said table, seal supporting means provided on said table and circumferentially spaced therearound, a seal loading station and a seal testing station and an unacceptable seal ejection station and an acceptable seal ejection station spaced in sequence circumjacent said table, said feed mechanism being actuable to rotatably index said table from station to station in a repetitive seal testing cycle, seal loading means to position a test seal on each of said seal supporting means at said loading station, a servomotor mechanism provided at said testing station, another servomotor mechanism provided at said unacceptable seal ejection station, a fluid distribution valve provided for and controllably connected to each of said servomotor mechanisms, a high pressure fluid source, an inlet conduit extending from said fluid source to each of the distribution valves, pressure regulating means provided in said inlet conduit, said servomotor mechanisms being actuable by fluid flow from said inlet conduit through said distribution valves, a plurality of control valves controllably connected to the distribution valves to control fluid flow therethrough to said servomotor mechanisms, timer mechanism controllably connected to said control valves for actuation thereof in a predetermined manner, a gauge head controllably connected to said testing station servomotor mechanism and movable thereby between a retracted position and a seal testing position, an ejection mechanism controllably connected to said ejection station servomotor mechanism and movable thereby between a retracted position and an ejection position, a hydraulic-electrical control circuit associated with said testing station and comprising: a gauge head control valve actuable by said timer mechanism to actuate the testing station servomotor mechanism and move said ejection mechanism to the seal testing position, a fluid conduit connecting said gauge head to said inlet conduit, fluid flow directing means provided by said gauge head to direct and confine fluid flow through said gauge head in the testing position to a flow path past the test seal, an orifice of reduced diameter in said fluid conduit, pressure regulating means in said fluid conduit between said orifice and said inlet conduit, pressure accumulator means in said fluid conduit to supply fluid to said gauge head at gradually increasing pressures, a fluid flow control valve in said fluid conduit, said fluid flow control valve being actuable by said timing mechanism to confine fluid flow in said fluid conduit to the portion of the testing cycle whereat said gauge head is in the seal testing position, a fluid flow rate measuring device connected to said fluid conduit adjacent said orifice, an electrical circuit, a control switch in said electrical circuit actuably connected to said measuring device and being actuable thereby in response to predetermined flow rates past said test seal when said gauge head is in the testing position, relay means in said electrical circuit and being responsive to actuation of said control switch, an unacceptable seal circuit controlled by said relay means and being energizable thereby in response to the predetermined flow rates, a pressure responsive switch in said unacceptable seal circuit, said pressure responsive switch being controllably connected to said fluid conduit and being positionable between a low pressure circuit-closing position and a high pressure circuit-closing position in response to fluid pressures therein, a counter and a signal light and solenoid means provided in said unacceptable seal circuit and being actuated by energization thereof, said unacceptable seal circuit being energized by actuation of said control switch by said measuring device in response to the predetermined flow rate when said pressure responsive switch is in said low pressure circuit-closing position and being energized by non-actuation of said control switch by said measuring device when said pressure responsive switch is in said high pressure circuit-closing position, said solenoid means being controllably associated with an ejection mechanism control valve, said ejection mechanism control valve being controllably connected to a fluid distribution valve controllably connected to the ejection station servomotor mechanism, said ejection mechanism control valve being actuable in response to energization of said unacceptable seal circuit to actuate said ejection station servomotor mechanism and move said ejection mechanism to the ejection position, another gauge head control valve actuable by said timing mechanism to actuate said testing station servomotor and move said gauge head to the retracted position after a predetermined testing interval, a feed mechanism control valve controllably connected to said feed mechanism and actuable by said timer mechanism to cause said table to be indexed to the unacceptable seal ejection station after said predetermined testing interval, another ejection mechanism control valve controllably connected to the ejection station fluid distribution valve and actuable by said timing mechanism after indexing movement of said table to said unacceptable seal ejection station to actuate said ejection station servomotor mechanism and move said ejection mechanism to the retracted position and thereby remove the test seal from said table, and ejection means to remove acceptable seals at said acceptable seal ejection station.

14. Seal testing apparatus comprising, an indexable rotary table, fluid actuable feed mechanism drivingly associated with said table, seal supporting means provided on said table and circumferentially spaced therearound, a seal loading station and a seal testing station and an unacceptable seal ejection station and an acceptable seal ejection station spaced in sequence circumjacent said table, said feed mechanism being actuable to rotatably index said table from station to station in a repetitive seal testing cycle, seal loading means to position a test seal on each of said seal supporting means at said loading station, a servomotor mechanism provided at said testing station, another servomotor mechanism provided at said unacceptable seal ejection station, a fluid distribution valve provided for and controllably connected to each of said servomotor mechanisms, a high pressure fluid source, an inlet conduit extending from said fluid source to each of the distribution valves, pressure regulating means provided in said inlet conduit, said servomotor mechanisms being actuable by fluid flow from said inlet conduit through said distribution valves, a plurality of control valves controllably connected to the distribution valves to control fluid flow therethrough to said servomotor mechanisms, timer mechanism controllably connected to said control valves for actuation thereof in a predetermined manner, a gauge head controllably connected to said testing station servomotor mechanism and movable thereby between a retracted position and a seal testing position, an ejection mechanism controllably connected to said ejection station servomotor mechanism and movable thereby between a retracted position and an ejection position, a hydraulic-electrical control circuit associated with said testing station and comprising: a gauge head control valve actuable by said timer mechanism to actuate the testing station servomotor mechanism and move said ejection mechanism to the seal testing position, a fluid conduit connecting said gauge head to said inlet conduit, fluid flow directing means provided by said gauge head to direct and confine fluid flow through said gauge head in the testing position to a flow path past the test seal, pressure regulating means in said fluid conduit, pressure accumulator means in said fluid conduit to supply fluid to said gauge head at gradually increasing pressures, a fluid flow control valve in said fluid conduit, said fluid flow control valve being actuable by said timing mechanism to confine fluid flow in said fluid conduit to the portion of the testing cycle whereat said gauge head is in the seal testing position, a fluid flow rate measuring device connected to said fluid conduit, an electrical circuit, a control switch in said electrical circuit actuably connected to said measuring device and being actuable thereby in response to predetermined flow rates past said test seal when said gauge head is in the testing position, relay means in said electrical circuit and being responsive to actuation of said control switch, an unacceptable seal circuit controlled by said relay means and being energizable thereby in response to the predetermined flow rates, a pressure responsive switch in said unacceptable seal circuit, said pressure responsive switch being controllably connected to said fluid conduit and being positionable between a low pressure circuit-closing position and a high pressure circuit-closing position in response to fluid pressures therein, solenoid means provided in said unacceptable seal circuit and being actuated by energization thereof, said unacceptable seal circuit being energized by actuation of said control switch by said measuring device in response to the predetermined flow rate when said pressure responsive switch is in said low pressure circuit-closing position and being energized by non-actuation of said control switch by said measuring device when said pressure responsive switch is in said high pressure circuit-closing position, said solenoid means being controllably associated with an ejection mechanism control valve, said ejection mechanism control valve being controllably connected to a fluid distribution valve controllably connected to the ejection station servomotor mechanism, said ejection mechanism control valve being actuable in response to energization of said unacceptable seal circuit to actuate said ejection station servomotor mechanism and move said ejection mechanism to the ejection position, another gauge head control valve actuable by said timing mechanism to actuate said testing station servomotor and move said gauge head to the retracted position after a predetermined testing interval, a feed mechanism control valve controllably connected to said feed mechanism and actuable by said timer mechanism to cause said table to be indexed to the unacceptable seal ejection station after said predetermined testing interval, another ejection mechanism control valve controllably connected to the ejecting station fluid distribution valve and actuable by said timing mechanism after indexing movement of said table to said unacceptable seal ejection station to actuate said ejection station servomotor mechanism and move said ejection mechanism to the retracted position and thereby remove the test seal from said table, and ejection means to remove acceptable seals at said acceptable seal ejection station.

15. Seal testing apparatus comprising a source of high pressure fluid, a fluid delivery system, fluid pressure control means to maintain fluid in said delivery system at predetermined pressures, seal supporting means comprising an indexable rotary table, seal seats provided on said table, each of said seats including a central flow port and being dimensioned to retain a test seal circumjacent said flow port, seal gauging mechanism comprising a central support member, a gaging head slidably supported on said central support and having a central fluid cavity defined by a central bore and said central support member, a fluid conduit connecting said gaging head to said fluid delivery system, a test shaft removably secured to said central support, a test seal seat provided in said gage head and located circumjacent said test shaft and defining therewith a flow passage intersecting said central fluid cavity, fluid sealing means associated with said gaging head to confine fluid flow to a path through said flow passage and axially along said test shaft when a test seal is positioned in said test seal seat provided by said gage head, seal gauging mechnism control means controllably connected to said gauging mechanism and being actuable to position a test seal carried by said seal supporting means circumjacent and in sealing relationship to said test shaft and within said test seal seat provided by said gage head in a seal testing position, said fluid sealing means confining fluid flow to a flow path past the test seal and through the central flow port in the testing position, fluid flow rate measuring means connected to said fluid conduit, unacceptable seal ejection means, and unacceptable seal ejection means control apparatus controllably connected to said ejection means and being actuable by said measuring means in response to predetermined flow rates through said test seal and through said central flow port to actuate said unacceptable seal ejection means and remove unacceptable seals from said seal seats.

16. Seal testing apparatus comprising indexable conveyor means, a plurality of test seal retaining means provided on said conveyor means, a fluid flow port associated with each of said seal retaining means, ejection guide-way means associated with each of said seal retaining means, drive means connected to said conveyor means, drive means control apparatus controllably connected to said drive means to cause indexing movement of said conveyor means in a predetermined manner past a plurality of work stations in a repetitive testing cycle, said work stations being spaced along and adjacent the path of movement of said conveyor means, automatic seal loading means to deposit a test seal on each of said seal retaining means prior to movement thereof past said work stations, said working stations comprising in sequence and alternately along the path of movement of said conveyor means, testing stations and seal ejection stations, each testing station comprising: seal gauging means, a seal testing member provided by said seal gauging means, a high pressure fluid source, fluid conveying means to supply fluid to said seal gauging means, pressure regulating means connected to said fluid conveying means to maintain a constant fluid pressure at said seal gauging means, gauging means control apparatus controllably connected to said gauging means and actuable to position said testing member in sealing relationship with the test seals on said seal retaining means, fluid flow directing means provided by said seal gauging means to confine fluid flow from said fluid conveying means to a flow path between said test member and the test seal and outwardly through said fluid flow port, fluid flow rate measuring means connected to said fluid conveying means, each of said ejection stations having seal ejection mechanism comprising: unacceptable seal removing means, seal removing means control apparatus controllably connected to said seal removing means, said seal removing control apparatus being actuably connected to said measuring means and actuated thereby in response to predetermined rates of fluid flow past the test seal and through said fluid flow port in said testing position to move said seal removing means to an ejection position relative to said test seal causing said predetermined rates of fluid flow, said seal removing means being further actuable by said seal removing control apparatus after the test seal is indexed on the conveyor means to the ejection station to remove the test seal through said ejection guide-way means, and acceptable seal discharge means provided along the path of movement of said conveyor means beyond said work stations to remove acceptable seals from said test seal retaining means.

17. Seal testing apparatus comprising conveyor means, test seal retaining means provided on said conveyor means, drive means connected to said conveyor means, drive means control apparatus controllably connected to said drive means to cause movement of said conveyor means in a predetermined manner past a plurality of work stations in a repetitive testing cycle, said work stations being spaced along and adjacent the path of movement of said conveyor means, seal loading means to deposit a test seal on said seal retaining means prior to movement thereof past said work stations, said working stations comprising testing stations and seal ejection stations, each testing station comprising: seal gauging means, a seal testing member provided by said seal gauging means, a pressure fluid source, fluid conveying means to supply fluid to said seal gauging means, pressure regulating means connected to said fluid conveying means to maintain a predetermined fluid pressure at said seal gauging means, gauging means control apparatus controllably connected to said gauging means and actuable to position said testing member in sealing relationship with the test seals on said seal retaining means in a seal testing position, fluid flow directing means provided by said seal gauging means to confine fluid flow from said fluid conveying means to a flow path between said test member and the test seal, fluid flow rate measuring means connected to said fluid conveying means, each of said ejection stations having seal ejection mechanism comprising: unacceptable seal removing means, seal removing means control apparatus controllably connected to said seal removing means, said seal removing control apparatus being actuably connected to said measuring means and actuated thereby in response to predetermined rates of fluid flow past the test seal in said testing position to move said seal removing means to an ejection position relative to said test seal causing said predetermined rates of fluid flow, said seal removing means being further actuable by said seal removing control aparatus after the test seal is moved on the conveyor means to an ejection station to remove the test seal from said test seal retaining means, and acceptable seal discharge means provided along the path of movement of said conveyor means beyond said work stations to remove acceptable seals from said test seal retaining means.

18. Seal testing apparatus comprising, indexable conveyor means, a plurality of seal retaining means provided on said conveyor means, a fluid flow port associated with each of said seal retaining means, ejection guideway means associated with each of said seal retaining means, drive means connected to said conveyor means, a plurality of alternately spaced seal testing stations and unacceptable seal ejection stations alternately spaced in sequence along the path of movement of said conveyor means, drive means control apparatus controllably connected to said drive means to index said conveyor means in a predetermined manner from station to station in a repetitive testing cycle, automatic seal loading means to position a test seal on each of said seal retaining means at said loading station, a power source, power actuable control mechanism at each of said testing and ejection stations, power transferring means connecting said power source and said power actuable control mechanism, power transfer control apparatus controllably connected to each of said control mechanisms, timer means associated with said power transfer control apparatus to cause actuation of said power actuable control mechanism in a predetermined manner, seal gauging means actuably connected to said power actuable control mechanism at each testing station and being actuable thereby between a retracted position and a seal testing position, an unacceptable seal ejection mechanism actuably connected to said power actuable control mechanism at each ejection station and being actuable thereby between a retracted position and an ejection position, a high pressure fluid source, a fluid conduit connecting said fluid source and said seal gauging means, pressure regulating means provided in said fluid conduit to maintain a constant pressure at said seal gauging means, a fluid flow rate measuring device connected to said fluid conduit, seal gauging means power transfer control apparatus actuable by said timer means to actuate said testing station control mechanism and move said gauging means to the testing position, an unacceptable seal circuit, switch means actuably connected to said fluid flow rate measuring device, said switch means being actuable by said fluid flow rate measuring device in response to predetermined flow rates through said gauging means to an unacceptable seal circuit energizing position, ejection mechanism power transfer control apparatus being connected to said unacceptable seal circuit and energized therewith to cause actuation of the power actuable control mechanism at the subsequent ejection station and actuate the ejection mechanism to the ejection position, another gauging means control apparatus actuable by said timer means to cause actuation of said power actuable control mechanism at said testing station and actuate said seal gauging means to the retracted position, said conveyor drive means control apparatus being thereafter actuable by said timer means to cause indexing movement of said conveyor means to the subsequent ejection station, and another ejection means control apparatus being actuable by said timer means to cause actuation of the ejection station power actuable control mechanism and actuate said ejection mechanism to the retracted position and thereby remove unacceptable test seals from said seal retaining means.

19. Seal testing apparatus comprising, conveyor means, a plurality of seal retaining means provided on said conveyor means, drive means connected to said conveyor means, a plurality of alternately spaced seal testing stations and unacceptable seal ejection stations alternately spaced in sequence along the path of movement of said conveyor means, drive means control apparatus controllably connected to said drive means to move said conveyor means in a predetermined manner from station to station in a repetitive testing cycle, seal leading means to position a test seal on each of said seal retaining means at said loading station, a power source, power actuable control mechanism at each of said testing and ejection stations, power transferring means connecting said power source and said power actuable control mechanism, power transfer control apparatus controllably connected to each of said control mechanisms, timer means associated with said power transfer control apparatus to cause actuation of said power actuable control mechanism in a predetermined manner, seal gauging means actuably connected to said power actuable control mechanism at each testing station and being actuable thereby between a retracted position and a seal testing position, an unacceptable seal ejection mechanism actuably connected to said power actuable control mechanism at each ejection station and being actuable thereby between a retracted position and an ejection position, a pressure fluid source, a fluid conduit connecting said fluid source and said seal gauging means, pressure regulating means provided in said fluid conduit to maintain a constant pressure at said seal gauging means, a fluid flow rate measuring device connected to said fluid conduit, seal gauging means power transfer control apparatus actuable by said timer means to actuate said testing station control mechanism and move said gauging means to the testing position, an unacceptable seal circuit, switch means actuably connected to said fluid flow rate measuring device, said switch means being actuable by said fluid flow rate measuring device in response to predetermined flow rates through said gauging means to an unacceptable seal circuit energizing position, ejection mechanism power transfer control apparatus being connected to said unacceptable seal circuit and energized therewith to cause actuation of the power actuable control mechanism at the subsequent ejection station and actuate the ejection mechanism to the ejection position, another gauging means control apparatus actuable by said timer means to cause actuation of said power actuable control mechanism at said testing station and actuate said seal gauging means to the retracted position, said conveyor drive means control apparatus being thereafter actuable by said timer means to cause movement of said conveyor means to the subsequent ejection station, and another ejection means control apparatus being actuable by said timer means to cause actuation of the ejection station power actuable control mechanism and actuate said ejection mechanism to the retracted position and thereby remove unacceptable test seals from said seal retaining means.

20. The test apparatus as defined in claim 19 and having circuit control means responsive to the position of said gauging means to prevent energization of said unacceptable seal circuit unless said gauging means is in the seal testing position.

21. Seal testing apparatus comprising indexable conveyor means, a plurality of test seal retaining means provided on said conveyor means, a fluid flow port associated with each of said seal retaining means, ejection guide-way means associated with said seal retaining means, a seal loading station and a seal testing station and an unacceptable seal ejection station and an acceptable seal ejection station spaced in sequence adjacent the path of movement of said indexable conveyor means, conveyor drive means operably connected to said conveyor means, conveyor drive means control apparatus controllably connected to said drive means to cause indexing movement of said conveyor means from station to station in a repetitive seal testing cycle, automatic seal loading means to deposit a test seal on each of said seal retaining means at said loading station, a power actuable control mechanism provided at said testing station, another power actuable control mechanism provided at said unacceptable seal ejection station, a power source, power transferring means connecting said power source and the control mechanisms, power transfer control apparatus controllably connected to said power transferring means, seal gauging means controllably connected to the power actuable control mechanism at the testing station and movably actuable thereby between a retracted position and a seal testing position, seal ejection means controllably connected to the power actuable control mechanism at the unacceptable seal ejection station and movably actuable thereby between a retracted position and an ejection position, timer means associated with said power transfer control apparatus, seal gauging means control apparatus actuable by said timer means to actuate the testing station control mechanism and move the seal gauging means to the seal testing position, a high pressure fluid source, a fluid conduit extending from said high pressure fluid source to said seal gauging means, pressure regulating means in said fluid conduit to maintain a constant pressure therein, fluid flow directing means provided by said seal gauging means to confine fluid flow to a flow path through said test seal in the testing position in a predetermined manner, a fluid flow rate measuring device connected to said fluid conduit, an unacceptable seal circuit, an unacceptable seal circuit control switch controllably connected to said flow rate measuring device and actuable thereby to a circiut-energizing position in response to predetermine flow rates past said test seal in the testing position, ejection means control apparatus connected to said unacceptable seal circuit and energized therewith, said ejection means control apparatus being controllably connected to the ejection station power actuable control mechanism to cause said ejection means to be actuated to the ejection position in response to the predetermined flow rates, another gauging means control apparatus actuably connected to said timer means and actuable thereby to cause actuation of the testing station power actuable control mechanism and actuate said gauging means to the retracted position after a predetermined testing interval, said conveyor drive means control apparatus being actuably connected to said timer mechanism and actuable thereby after said predetermined testing interval to actuate said conveyor drive means and cause said conveyor means to be indexed to the unacceptable seal ejection station, another ejection means control apparatus actuably connected to said timer means and actuable thereby after indexing movement of said conveyor means to said unacceptable seal ejection station to cause actuation of the ejection station power actuable control mechanism and actuate said ejection means to the retracted position and thereby remove the unacceptable test seals from said conveyor means, and acceptable seal ejection means to remove acceptable seals from said conveyor means.

22. Seal testing apparatus comprising conveyor means, a plurality of test seal retaining means provided on said conveyor means, a seal loading station and a seal testing station and an unacceptable seal ejection station spaced in sequence adjacent the path of movement of said conveyor means, conveyor drive means operably connected to said conveyor means, conveyor drive means control apparatus controllably connected to said drive means to cause movement of said conveyor means from station to station in a repetitive seal testing cycle, seal loading means to deposit a test seal on each of said seal retaining means at said loading station, a power actuable control mechanism provided at said testing station, another power actuable control mechanism provided at said unacceptable seal ejection station, a power source, power transferring means connecting said power source and the control mechanisms, power transfer control apparatus controllably connected to said power transferring means, seal gauging means controllably connected to the power actuable control mechanism at the testing station and movably actuable thereby between a retracted position and a seal testing position, seal ejection means controllably connected to the power actuable control mechanism at the unacceptable seal ejection station and movably actuable thereby between a retracted position and an ejection position, timer means associated with said power transfer control apparatus, seal gauging means 75 control apparatus actuable by said timer means to actuate the testing station control mechanism and move the seal gauging means to the seal testing position, a pressure fluid source, a fluid conduit extending from said pressure fluid source to said seal gauging means, pressure regulating means in said fluid conduit to maintain a constant pressure therein, fluid flow directing means provided by said seal gauging means to confine fluid flow to a flow path through said test seal in the testing position in a predetermined manner, a fluid flow rate measuring device connected to said fluid conduit, an unacceptable seal circuit, an unacceptable seal circuit control switch controllably connected to said flow rate measuring device and actuable thereby to a circuit-energizing position in response to predetermined flow rates past said test seal in the testing position, ejection means control apparatus connected to said unacceptable seal circuit and energized therewith, said ejection means control apparatus being controllably connected to the ejection station power actuable control mechanism to cause said ejection means to be actuated to the ejection position in response to the predetermined flow rates, another gauging means control apparatus actuably connected to said timer means and actuable thereby to cause actuation of the testing station power actuable contol mechanism and actuate said gauging means to the retracted position after a predetermined testing interval, said conveyor drive means control apparatus being actuably connected to said timer mechanism and actuable thereby after said predetermined testing interval to actuate said conveyor drive means and cause said conveyor means to be moved to the unacceptable seal ejection station, and another ejection means control apparatus actuably connected to said timer means and actuable thereby after movement of said conveyor means to said unacceptable seal ejection station to cause actuation of the ejection station power actuable control mechanism and actuate said ejection means to the retracted position and thereby remove the unacceptable test seals from said conveyor means.

23. The testing apparatus as defined in claim 22 and having unacceptable seal circuit energization control means to prevent actuation of said ejection means control apparatus unless said gauging means is in said testing position.

24. Seal testing apparatus comprising indexable conveyor means, a plurality of test seal retaining means provided on said conveyor means, a fluid flow port associated with each of said seal retaining means, ejection guide-way means associated with said seal retaining means, a seal loading station and a seal testing station and an unacceptable seal ejection station and an acceptable seal ejection station spaced in sequence adjacent the path of movement of said conveyor means, conveyor drive means, conveyor drive means control apparatus to movably index said conveyor means from station to station in a repetitive seal testing cycle, automatic seal loading means to deposit a test seal on each of said seal retaining means at said loading station, power actuable control mechanism provided at said testing station, another power actuable control mechanism provided at said unacceptable seal ejection station, a power source, power transferring means connecting said power source and the power actuable control mechanisms, power transfer control apparatus controllably connected to said power transferring means, timer means operably connected to said power transfer control apparatus, seal gauging means provided at said testing station and actuably connected to the testing station power actuable control mechanism and actuable thereby between a retracted position and a seal testing position, an ejection device actuably connected to the ejection station power actuable control mechanism and being movably actuable thereby between a retracted position and an ejection position, gauging means control apparatus actuably connected to said timer means and actuable thereby to cause actuation of the testing station power actuable control mechanism and to move said gauging means to the seal testing position, a high pressure fluid source, a fluid conduit connecting said high pressure fluid source to said gauging means, fluid flow directing means provided by said gauging means to direct and confine fluid flow through said gauging means in the testing position to a path through the test seal, pressure control means provided in said conduit to supply fluid to said gauging means at gradually increasing pressures, a flow control valve in said fluid conduit, valve control apparatus actuably connected to said timer means and actuable thereby to confine fluid flow in said fluid conduit to the portion of the testing cycle when said gauging means is in the seal testing position, a fluid flow rate measuring device connected to said fluid conduit, an unacceptable seal circuit, an unacceptable seal circuit control switch connected to and actuable by said measuring device in response to predetermined flow rates past said test seal when said gauge head is in the testing position, pressure responsive switch means in said unacceptable seal circuit, said pressure responsive switch being connected to said fluid conduit and being positionable between a plurality of circuit-closing positions in response to fluid pressures in said fluid conduit, said unacceptable seal circuit being energized by actuation of said control switch in response to predetermined flow rates when said pressure responsive switch is in one of said circuit-closing positions and being energized by non-actuation of said control switch when said pressure responsive switch is in another of said circuit-closing positions, ejection device control apparatus connected to said unacceptable seal circuit and energized therewith and controllably connected to said ejection station power actuable control mechanism to move said ejection device to the ejection position, another gauging means control apparatus being connected to and actuable by said timer means and controllably connected to said testing station power actuable control mechanism to move said gauging means to the retracted position after a predetermined testing interval, said conveyor drive means control apparatus being connected to and actuable by said timer means after said predetemined testing interval to actuate said conveyor drive means and index said conveyor means to said testing station, another ejection device control apparatus connected to and actuable by said timer means after indexing movement of said conveyor means to said unacceptable seal ejection station and actuably connected to said ejection station power actuable control mechanism to actuate the ejection device to the retracted position and thereby remove the test seal from said conveyor means, and acceptable seal ejection means to remove acceptable seals from said conveyor means at said acceptable seal ejection station.

25. Seal testing apparatus comprising conveyor means, test seal retaining means provided on said conveyor means, a seal loading station and a seal testing station and an unacceptable seal ejection station spaced in sequence adjacent the path of movement of said conveyor means, conveyor drive means, conveyor drive means control apparatus to cause movement of said conveyor means from station to station in a repetitive seal testing cycle, seal loading means to deposit a test seal on each of said seal retaining means at said loading station, power actuable control mechanism provided at said testing station, another power actuable control mechanism provided at said unacceptable seal ejection station, a power source, power transferring means connecting said power source and the power actuable control mechanisms, power transfer control apparatus controllably connected to said power transferring means, timer means operably connected to said power transfer control apparatus, seal gauging means provided at said testing station and actuably connected to the testing station power actuable control mechanism and actuable thereby between a retracted position and a seal testing position, an ejection device actuably connected to the ejection station power actuable control mechanism and being movably actuable thereby between a retracted position and an ejection position, gauging means control apparatus actuably connected to said timer means and actuable thereby to cause actuation of the testing station power actuable control mechanism and to move said gauging means to the seal testing position, a pressure fluid source, a fluid conduit connecting said pressure fluid source to said gauging means, fluid flow directing means provided by said gauging means to direct and confine fluid flow through said gauging means in the testing position to a path through the test seal, pressure control means provided in said conduit to supply fluid to said gauging means at gradually increasing pressures, a flow control valve in said fluid conduit, valve control apparatus actuably connected to said timer means and actuable thereby to confine fluid flow in said fluid conduit to the portion of the testing cycle when said gauging means is in the seal testing position, a fluid flow rate measuring device connected to said fluid conduit, an unacceptable seal circuit, an unacceptable seal circuit control switch connected to and actuable by said measuring device in response to predetermined flow rates past said test seal when said gauge head is in the testing position, pressure responsive switch means in said unacceptable seal circuit, said pressure responsive switch being connected to said fluid conduit and being positionable between a plurality of circuit-closing positions in response to fluid pressures in said fluid conduit, said unacceptable seal circuit being energized by actuation of said control switch in response to predetermined flow rates when said pressure responsive switch is in one of said circuit-closing positions and being energized by non-actuation of said control switch when said pressure responsive switch is in another of said circuit-closing positions, ejection device control apparatus connected to said unacceptable seal circuit and energized therewith and controllably connected to said ejection station power actuable control mechanism to move said ejection device to the ejection position, another gauging means control apparatus being connected to and actuable by said timer means and controllably connected to said testing station power actuable control mechanism to move said gauging means to the retracted position after a predetermined testing interval, said conveyor drive means control apparatus being connected to and actuable by said timer means after said predetermined testing interval to actuate said conveyor drive means and move said conveyor means to said testing station, and another ejection device control apparatus connected to and actuable by said timer means after movement of said conveyor means to said unacceptable seal ejection station and actuably connected to said ejection station power actuable control mechanism to actuate the ejection device to the retracted position and thereby remove the test seal from said conveyor means.

26. The seal testing apparatus as defined in claim 25 and having control switch means controllably connected to said gauging means control apparatus, and said control switch means being supported adjacent said conveyor means and located relative to the path of movement of said conveyor means prior to said testing stations and in the path of movement of said conveyor means and being actuable by the absence of a test seal on said seal retaining means to prevent actuation of subsequent testing station testing members to the sealing relationship position until and unless a test seal is rotated to the subsequent testing station.

27. Seal testing apparatus comprising conveyor means, test seal retaining means provided on said conveyor means, conveyor drive means connected to said conveyor means, conveyor drive means control apparatus controllably connected to said conveyor drive means to cause movement of said conveyor means in a predetermined manner past a plurality of work stations in a repetitive testing cycle, said work stations being spaced along and adjacent the path of movement of said conveyor means, seal loading means to deposit a test seal on said seal retaining means prior to movement thereof past said work stations, said work stations comprising testing stations and unacceptable seal ejection stations, power actuable control mechanism provided at each of said stations, a power source, power transferring means connecting said power source and each of said power actuable control mechanism, power transfer control apparatus controllably connected to said power transferring means, timer means operably connected to said power transfer control apparatus, seal gauging means controllably connected to the power actuable control mechanism at each testing station and being movably actuable thereby between a retracted position and a seal testing position, gauging means control apparatus actuably connected to said timer means and actuable thereby to cause actuation of each of the testing station power actuable control mechanisms and to move each of said gauging means to the seal testing position, a fluid pressure source, fluid conduit means connecting said fluid pressure source to each of said gauging means, fluid flow directing means provided by each of said gauging means to direct and confine fluid flow through said gauging means in the testing position to a path through the test seal; one of said testing stations comprising: pressure regulating means in the fluid conduit means associated with said one of said testing stations to maintain a constant pressure therein, a fluid flow rate measuring device connected to said fluid conduit means, an unacceptable seal circuit, an unacceptable seal circuit switch controllably connected to said flow rate measuring device and actuable thereby to a circuit energizing position in response to predetermined flow rates past said test seal in the testing position at said one of said testing stations, ejection means control apparatus connected to said unacceptable seal circuit and energized therewith, an ejection device at one of said unacceptable seal ejection stations being actuably connected to the ejection station power actuable control mechanism associated therewith and being movably actuable thereby between a retracted position and an ejection position, said ejection means control apparatus being controllably connected to the ejection station power actuable control mechanism at said one of said unacceptable seal ejection stations to cause said ejection means to be actuated to the ejection position in response to the predetermined flow rates past said test seal at said one of said testing stations, another gauging means control apparatus actuably connected to said timer means and actuable thereby to cause actuation of the testing station power actuable control mechanism at said one of said testing stations and actuate said gauging means to the retracted position after a predetermined testing interval, said conveyor drive means control apparatus being actuably connected to said timer mechanism and actuable thereby after said predetermined testing interval to actuate said conveyor means and cause said conveyor means to be moved to said one of said unacceptable seal ejection stations, another ejection means control apparatus actuably connected to said timer means and actuable thereby after movement of said conveyor means to said one of said unacceptable seal ejection stations to cause actuation of the ejection station power actuable control mechanism thereat and actuate said ejection means to the retracted position and thereby remove the unacceptable test seals from said conveyor means; another testing station comprising: pressure control means provided in the fluid conduit means associated with said other of said testing stations to supply fluid to said gauging means at gradually increasing pressures, a flow control valve in said fluid conduit means, valve control apparatus actuably connected to said timer means and actuable thereby to confine fluid flow in said fluid conduit means to the portion of the testing cycle when said gauging means at said other testing station is in the seal testing position, a fluid flow rate measuring device connected to said fluid conduit means, another unacceptable seal circuit, another unacceptable seal circuit control switch connected to and actuable by said measuring device in response to predetermined flow rates past said test seal when said gauging means at said other of said testing stations is in the testing position, pressure responsive switch means in said other unacceptable seal circuit, said pressure responsive switch being connected to said fluid conduit means and being positionable between a plurality of circuit-closing positions in response to fluid pressures in said fluid conduit means, said other unacceptable seal circuit being energized by actuation of said other control switch in response to predetermined flow rates when said pressure responsive switch is in one of said circuit-closing positions and being energized by non-actuation of said control switch when said pressure responsive switch is in another of said circuit-closing positions, another ejection means control apparatus connected to said other unacceptable seal circuit and energized therewith and controllably connected to another ejection station power actuable control mechanism to move another ejection device to the ejection position, another gauging means control apparatus being connected to and actuable by said timer means and controllably connected to said other testing station power actuable control mechanism to move said gauging means to the retracted position after a predetermined testing interval, said conveyor means control apparatus being connected to and actuable by said timer means after said predetermined said testing interval to actuate said conveyor drive means and move said conveyor means to said testing position, and another ejection device control apparatus connected to and actuable by said timer means after movement of said conveyor means to said other unacceptable seal ejection station and actuably connected to said other ejection station power actuable control mechanism to actuate the other ejection device to the retracted position and thereby remove the test seal from said conveyor means.

28. An apparatus for determining the leakage characteristics of lip type shaft seals comprising; a pair of test shafts, one with a minimum and the other with a maximum test diameter, a pair of measuring stations, means for successively moving seals to be tested through said measuring stations, one of said measuring stations including said test shaft of minimum diameter for cooperatively receiving a seal from said seal moving means, the other of said measuring stations including said test shaft of maximum diameter for cooperatively receiving a seal from said seal moving means, and means associated with each of said measuring stations to apply fluid under pressure to said seal while in mounted position on said test shafts and to effect rejection of said seal when fluid leakage between said seal and test shafts exceeds predetermined limits.

29. An apparatus for determining the leakage characteristics of lip type shaft seals comprising; a pair of test shafts, one with a minimum and the other with a maximum test diameter, a pair of measuring stations, a reject station, means for successively moving seals to be tested through said measuring and reject stations, one of said measuring stations including said test shaft of minimum diameter for cooperatively receiving a seal from said seal moving means, the other of said measuring stations including said test shaft of maximum diameter for cooperatively receiving a seal from said moving means, associated with each of said measuring stations to apply fluid under pressure to said seal while in mounted position on said test shaft and to compare the leakage thereof with a predetermined standard, and means associated with said reject station to effect rejection of said seal when fluid leakage between said seal and test shafts exceeds said predetermined standard.

30. An apparatus for determining the leakage characteristics of lip type shaft seals comprising; a plurality of test shafts, one with a minimum, one with a maximum, and one with a nominal test diameter, a plurality of measuring stations, a plurality of associated reject stations, means for successively moving seals to be tested to said measuring and reject stations, a first measuring station including said test shaft of minimum diameter for cooperatively receiving a seal from said seal moving means, a second measuring station including said test shaft of maximum diameter for cooperatively receiving a seal from said seal moving means, a third measuring station including said test shaft of nominal diameter for cooperatively receiving a seal from said seal moving means, means associated with each of said measuring stations to apply fluid under pressure to said seal while in mounted position on said test shafts and to compare the leakage thereof with a predetermined standard, and means associated with each of said reject stations to effect rejection of said seal at a reject station when the leakage between said seal and said test shafts fails to conform to said predetermined standard.

References Cited in the file of this patent

UNITED STATES PATENTS

| | | |
|---|---|---|
| 2,059,038 | Sala | Oct. 27, 1936 |
| 2,593,958 | Aller | Apr. 22, 1952 |

UNITED STATES PATENT OFFICE
CERTIFICATE OF CORRECTION

Patent No. 3,132,507                                                  May 12, 1964

Robert L. Dega

It is hereby certified that error appears in the above numbered patent requiring correction and that the said Letters Patent should read as corrected below.

Column 4, line 18, after "head" insert -- 64 --; column 12, line 59, for "annual" read -- annular --; column 13, line 26, for "in" read -- to --; line 58, for "and" read -- an --; column 14, line 13, for "feet" read -- feed --; column 15, line 37, for "ratees" read -- rates --; column 23, line 73, for "leading" read -- loading --; column 25, line 21, for "circiut-" read -- circuit- --; column 26, line 25, for "contol" read -- control --; column 30, line 66, before "associated" insert -- means --; column 32, list of References Cited, add the following reference:
2,863,316 Abplanalp ------- Dec. 9, 1958
Signed and sealed this 13th day of April 1965.

(SEAL)
Attest:

ERNEST W. SWIDER                                       EDWARD J. BRENNER
Attesting Officer                                           Commissioner of Patents